(12) United States Patent
Jacobi et al.

(10) Patent No.: US 11,938,452 B2
(45) Date of Patent: Mar. 26, 2024

(54) WATER AND WASTEWATER CONDITIONING APPARATUS

(71) Applicant: Rezolv Technology LLC, Indianapolis, IN (US)

(72) Inventors: Robert W. Jacobi, Indianapolis, IN (US); Samuel Spencer Jacobi, Indianapolis, IN (US); Jadranko Grgic, Tuzla (BA)

(73) Assignee: REZOLV TECHNOLOGY LLC, Indianapolis, IN (US)

( * ) Notice: Subject to any disclaimer, the term of this patent is extended or adjusted under 35 U.S.C. 154(b) by 0 days.

(21) Appl. No.: 18/153,654

(22) Filed: Jan. 12, 2023

(65) Prior Publication Data

US 2023/0144514 A1    May 11, 2023

Related U.S. Application Data

(63) Continuation of application No. PCT/US2021/041613, filed on Jul. 14, 2021.
(Continued)

(51) Int. Cl.
*B01F 23/233* (2022.01)
*B01F 23/23* (2022.01)
(Continued)

(52) U.S. Cl.
CPC .... *B01F 23/23341* (2022.01); *B01F 23/2366* (2022.01); *B01F 23/237612* (2022.01);
(Continued)

(58) Field of Classification Search
CPC .......... B01F 2101/305; B01F 23/23341; B01F 23/2366; B01F 23/237612; B01F 27/50;
(Continued)

(56) References Cited

U.S. PATENT DOCUMENTS 2,383,086 A    8/1945 Sebald
3,295,681 A *  1/1967 Rubert ................ A01K 63/045
                                                    210/197

(Continued)

FOREIGN PATENT DOCUMENTS

KR    10-1452392         10/2014
WO    WO 1998/30319 A1   7/1998

OTHER PUBLICATIONS

International Search Report and Written Opinion corresponding to International Patent Application No. PCT/US2021/041613, dated Oct. 21, 2021 (9 pages).
(Continued)

*Primary Examiner* — Terry K Cecil
(74) *Attorney, Agent, or Firm* — Woodard, Emhardt, Henry, Reeves & Wagner, LLP

(57) ABSTRACT

A hydro turbulator system includes a volute that has a top duct and a bottom duct that allow fluid to enter and exit the volute. An impeller system including a first impeller and a second impeller is positioned within the volute. The first impeller and the second impeller are axially aligned. A motor is operationally connected to the impeller system so that the first impeller and the second impeller rotate upon operation of the motor. Rotation of the first impeller and the second impeller creates successive zones of high pressure and low pressure to agitate and condition fluid within the volute.

16 Claims, 17 Drawing Sheets

Related U.S. Application Data

(60) Provisional application No. 63/051,519, filed on Jul. 14, 2020.

(51) Int. Cl.
*B01F 23/237* (2022.01)
*B01F 27/91* (2022.01)
*B01F 101/00* (2022.01)
*C02F 1/20* (2023.01)

(52) U.S. Cl.
CPC ............... *B01F 27/91* (2022.01); *C02F 1/20* (2013.01); *B01F 2101/305* (2022.01); *C02F 2209/42* (2013.01)

(58) Field of Classification Search
CPC .... B01F 27/91; C02F 1/20; C02F 1/34; C02F 1/74; C02F 2101/322; C02F 2209/42; C02F 3/06; C02F 3/08; C02F 3/1278; Y02W 10/10; Y02W 10/37
See application file for complete search history.

(56) References Cited

U.S. PATENT DOCUMENTS

| | | | |
|---|---|---|---|
| 3,333,834 A | * | 8/1967 | Brewster .............. A01K 63/042 415/121.2 |
| 8,597,514 B2 | | 12/2013 | Bradley |
| 8,877,045 B1 | | 11/2014 | Bradley et al. |
| 2007/0039878 A1 | | 2/2007 | Roberts et al. |
| 2015/0001166 A1 | | 1/2015 | Ben-Horin et al. |

OTHER PUBLICATIONS

International Search Report corresponding to International Patent Application No. PCT/US2021/041613, dated Oct. 21, 2021 (2 pages).

\* cited by examiner

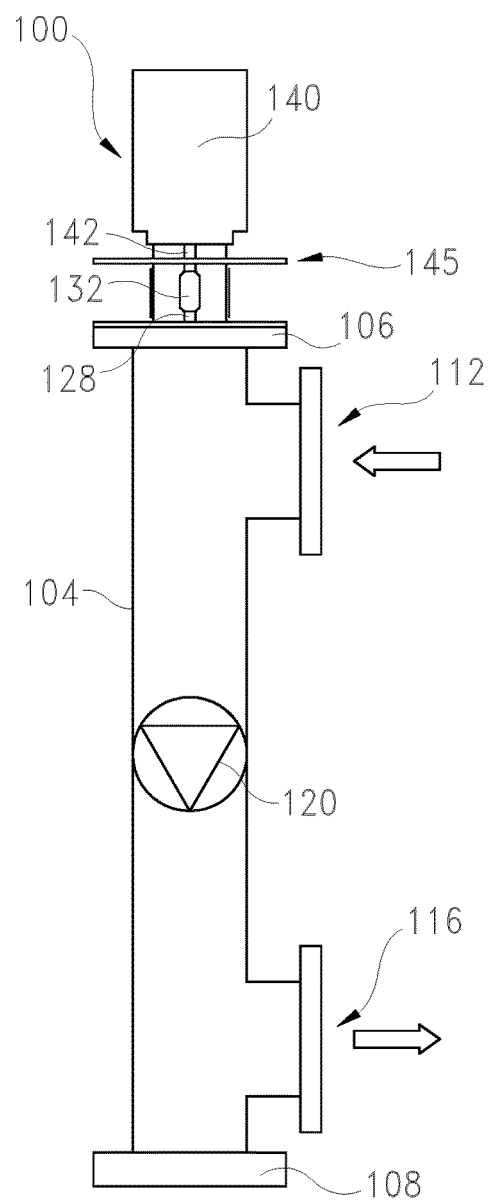 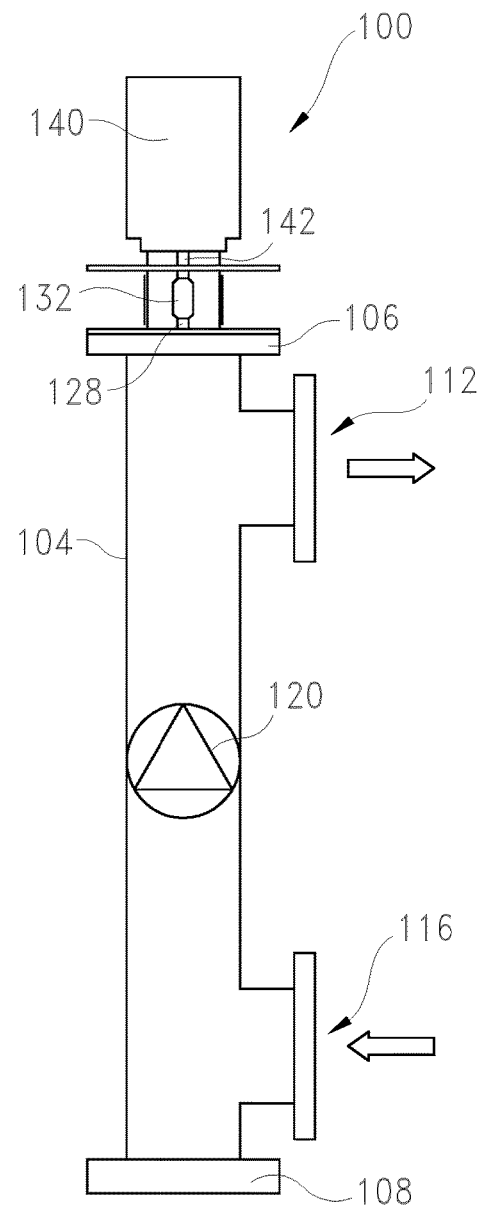
*Fig. 1A*  *Fig. 1B*

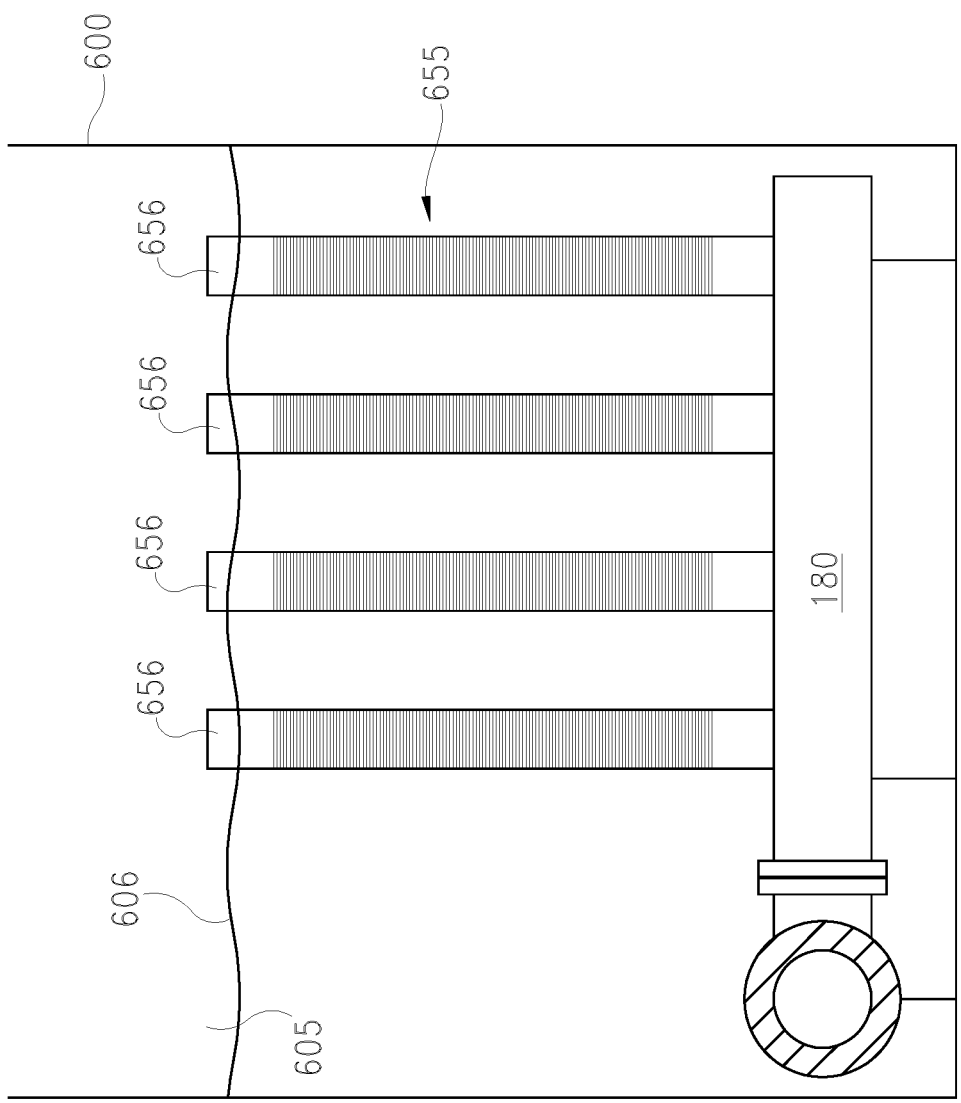

WATER AND WASTEWATER CONDITIONING APPARATUS

CROSS REFERENCE TO RELATED APPLICATIONS

This application is a continuation of International Patent Application No. PCT/US2021/041613, filed on Jul. 14, 2021, which claims the benefit of the filing date of Provisional U.S. Patent Application No. 63/051,519, filed on Jul. 14, 2020, which is hereby incorporated by reference in its entirety.

BACKGROUND

Wastewater is used water that includes foreign substances such as food scraps, oils, chemicals, human waste, and storm runoff. Treatment and conditioning of wastewater is beneficial to the environment and for health. The goal of treatment is to remove suspended solids and unwanted impurities in the wastewater. Aeration is an important component for the treatment of wastewater, as oxygen is need for the bacteria that help with biodegradation of the wastewater. This supplied oxygen is used by the bacteria to break down the organic matter in the wastewater. It is beneficial to have methods of moving or pumping wastewater that also increase the amount of oxygen in the wastewater.

Thus, there is a need for improvement in this field.

SUMMARY

Certain embodiments include a fluid conditioning apparatus as well as fluid treatment systems. In one form, the fluid conditioning apparatus is a hydro turbulator system. The hydro turbulator system may include a volute including a length and a first duct and a second duct. The first duct and the second duct may be configured to allow fluid to enter and exit the volute, depending on whether the hydro turbulator system is operating in an up flow or down flow configuration. In the up flow configuration, the first duct acts as an inlet while the second duct acts as an outlet. In the down flow configuration, the first duct acts as an outlet while the second duct acts as an inlet.

An impeller system may be positioned within the volute. The impeller system may include a drive impeller and a first agitation impeller that in some embodiments are positioned in series along a fluid flow path extending through the volute between the first duct and the second duct. In some embodiments, the impeller system may include a second agitation impeller that is positioned in series with the drive impeller and the first agitation impeller along the fluid flow path.

One or more motors may be operationally connected to the impeller system, and the motor may be capable of rotating the drive impeller and the first agitation impeller upon operation of the motor. Rotation of the drive impeller and the first agitation impeller may create successive zones of high pressure and low pressure to agitate and condition fluid that enters the volute. In some instances, the motor may be axially aligned with the drive impeller and with the first agitation impeller.

A ratio of the diameter of the drive impeller to a hydraulic diameter of the fluid flow path at the drive impeller is greater than a ratio of the diameter of the first agitation impeller to a hydraulic diameter of the fluid flow path at the first agitation impeller. The drive impeller differs from the first agitation impeller by diameter, blade pitch, and/or number of blades.

In some embodiments, the impeller system may include an impeller driveshaft that is operationally attached to the drive impeller and the first agitation impeller so that rotation of the impeller driveshaft rotates the drive impeller and the first agitation impeller. A motor shaft may be attached to the motor and be rotatable upon operation of the motor. A coupling may be used to connect the motor shaft to the impeller drive shaft so that rotation of the motor shaft causes rotation of the impeller drive shaft. A motor mounting assembly may be coupled to an end of the volute and may support the motor. The motor mounting assembly may provide access to the coupling connecting the motor shaft to the impeller driveshaft.

In some embodiments, the hydro turbulator system may include a casing that surrounds at a least a portion of the volute. The volute may be slidable within the casing. An internal support base can be positioned within the casing, and the volute can be supported within the casing by the internal support base.

In some embodiments, when the impeller system is configured in up flow configuration, fluid entering the hydro turbulator system may be lifted over a dike, a bank, or a flume while also off-gassing volatile chemicals and adding dissolved oxygen to the fluid. The hydro turbulator system may be capable of transferring high quantities of fluid at low horsepower.

In some embodiments, the hydro turbulator system may include a ring positioned within the volute near the position of the drive impeller. The ring may have a ring diameter that is smaller than the diameter of the walls of the volute, and the ring defines the hydraulic diameter of the fluid at the drive impeller.

In another form, the hydro turbulator system may be used in a fluid treatment system that includes a source fluid tank that can be filled with a source fluid to be treated. The hydro turbulator system may be in fluid communication with the source fluid tank. The hydro turbulator system used for the fluid treatment system may be similar to the hydro turbulator system already described above. For example, the hydro turbulator system may include a volute that has a top duct and a bottom duct that are configured to allow fluid to enter and exit the volute. An impeller system including a first impeller and a second impeller may be positioned within the volute. Rotation of the first impeller and the second impeller is configured to create successive zones of high pressure and low pressure to agitate and condition the fluid within the volute. In some embodiments, the first impeller and the second impeller may be axially aligned. Further, in some embodiments, the impeller system may include a third impeller axially aligned with the first impeller and the second impeller.

A gas capture tank may also be in fluid communication with the hydro turbulator system to receive fluid discharged from the hydro turbulator system. The gas capture tank may include treatment media configured to remove unwanted chemicals from the fluid discharged from the hydro turbulator system. In some embodiments, the fluid treatment system may also include a gas discharge blower attached to the gas capture tank. The gas discharge blower may remove off gassed volatile chemicals from the gas capture tank.

In some embodiments, the hydro turbulator system may be arranged in a dry configuration in which the hydro turbulator system is positioned exterior to the source fluid tank and the gas capture tank. In other embodiments, the hydro turbulator system may be arranged in a submerged or semi-submerged configuration in which the hydro turbulator may be at least partially submerged in the source fluid of the source fluid tank.

When in the semi-submerged configuration, a debris guard may surround the bottom duct of the hydro turbulator system. The debris guard can be configured to prevent large particles from entering the hydro turbulator system. In some instances, the hydro turbulator system can be supported within the source fluid tank by the debris guard.

Additionally, in the dry configuration, the agitation propellers of the hydro turbulator system 100 may be positioned at a location that has less head pressure in the static configuration when compared to the head pressure on the drive impeller in the static configuration. This arrangement further encourages the creation of cavitation by the agitation propellers to increase mixing and agitation of the fluid passing through the hydro turbulator system 100. In some embodiments, the head pressure at the agitation propellers is decreased by positioning the agitation propellers closer to the fluid level than the drive propeller.

In another form, the fluid treatment system comprising includes a fluid treatment tank filled with a fluid to be treated and a hydro turbulator system as described above. A discharge extension extending from either the top duct of the hydro turbulator system or the bottom duct of the hydro turbulator system. Fluid conditioned within the hydro turbulator system may be discharged into the fluid treatment tank from the discharge extension.

A suction extension pipe may extend from either the top duct or the bottom duct, whichever is the duct from which the discharge extension does not extend from. At least a portion of the suction extension pipe may be arranged to be substantially parallel to the discharge extension. The suction extension pipe may be configured to provide suction to pull fluid into the hydro turbulator system. In some embodiments, at least one debris pipe extends from the suction extension pipe. The debris pipe may prevent large particles within the fluid from entering the suction extension pipe.

Fixed treatment media can be positioned between at least a portion of the discharge extension and a portion of the suction extension pipe. Typically, the fixed treatment media may be positioned between the portions of the discharge extension and the suction extension pipe that are substantially parallel to each other. Fluid discharged from the discharge extension is pulled by the suction extension pipe so that the discharged fluid flows through the fixed treatment media.

The hydro turbulator system may be operated in either an up flow configuration (e.g., against the force of gravity) or in a down flow configuration (e.g., with the direction of gravity). When the hydro turbulator system is operated in the up flow configuration, the top duct is fluidly connected to the discharge extension and the bottom duct is fluidly connected to the suction extension pipe. In the down flow configuration, the top duct is fluidly connected to the suction extension pipe and the top duct is fluidly connected to the discharge pipe.

BRIEF DESCRIPTION OF THE DRAWINGS

FIG. 1A is a front elevation view of a hydro turbulator system with an impeller system operating in down flow.

FIG. 1B is a front elevation view of the hydro turbulator system of FIG. 1A with the impeller system operating in up flow.

FIG. 15 is a cross-sectional elevation end view of the hydro turbulator system and treatment tank of FIG. 12.

DESCRIPTION OF THE SELECTED EMBODIMENTS

Figure 2:
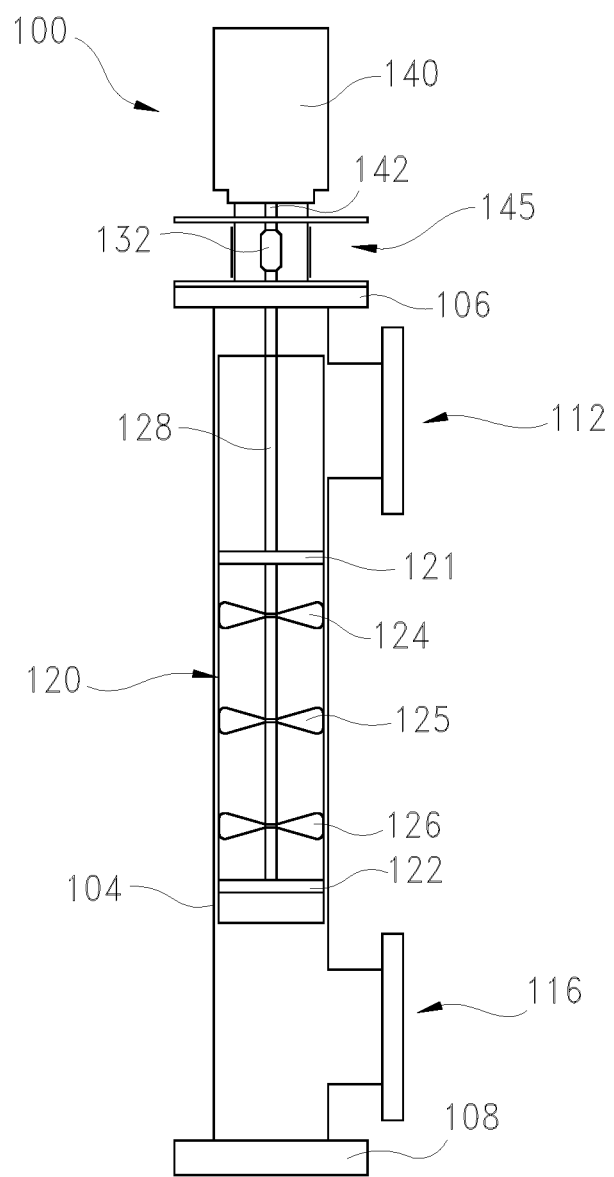
FIG. 2 is a cutaway view of the hydro turbulator system of FIGS. 1A and 1B.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

In some embodiments, a hydro turbulator system features a single impeller or multiple impellers/propellers. Fluid entering a volute of the hydro turbulator system encounters a drive impeller that produces high flow with low head. Additional impellers may be used to add flow and shear forces producing super cavitation from multiple low and high pressure areas that aggressively agitate the fluid and induce the formation of small and micro bubbles. These bubbles may off gas carbon dioxide ($CO_2$), volatile organic compounds (VOCs), hydrogen sulfide ($H_2S$), and microbubbles with oxygen to aerate the fluid and raise dissolved oxygen levels.

Typically, the hydro turbulator system is operated in a vertical configuration that can be run in either down flow (e.g., in the direction of the force of gravity) or up flow (e.g., against the force of gravity). The hydro turbulator system may be semi-submersibly installed inside a tank with a flooded inlet and/or outlet, either with or without piping. Alternatively, the hydro turbulator system may be mounted dry, outside a tank with flooded inlet and gravity or piped outlet connections from the tank.

FIGS. 1A and 1B each illustrate a hydro turbulator system 100 arranged in a different operating configuration. FIG. 1A shows the hydro turbulator system 100 in a down flow configuration, while FIG. 1B shows the hydro turbulator system in an up flow configuration. The hydro turbulator system 100 includes a housing that forms a volute 104. The volute 104 spans between a top plate 106 and a mounting base 108 that supports the volute 104. A top duct 112 and a bottom duct 116 are defined through the volute 104, allowing fluid to either enter or exit the volute depending on the configuration in which the hydro turbulator system 100 is operating. The top duct 112 is positioned nearer to the top plate 106 while the bottom duct 116 is positioned nearer to the mounting base 108. An impeller system 120 is positioned within the volute 104 and may include one or more impellers. The impeller system 120 is in fluid communication with the top duct 112 and the bottom duct 116.

A motor 140 is attached to one end of the volute 104. In the embodiment shown, the motor 140 is attached to the top plate 106 by a motor mounting assembly 145. The motor 140 may include a motor shaft 142 that attaches to an impeller driveshaft 128 of the impeller system 120 at a coupling 132. A water slinger may be positioned where the driveshaft 128 extends through the top plate 106 to prevent fluid escape through the opening in the top plate 128 through which the driveshaft 128 extends. The motor mounting assembly 145 may provide access to the coupling 132 connecting the motor shaft 142 and impeller driveshaft 128. In some embodiments, the motor 140 may be a 1 horsepower, 1800 rpm, severe duty motor. The motor 140 may use a traditional power source and/or may be configured to operate using a sustainable power source, such as solar power.

As shown, FIG. 1A illustrates the hydro turbulator system 100 in a down flow configuration. In the down flow configuration, the top duct 112 acts as an inlet for receiving the fluid to be treated. The bottom duct 116 acts as an outlet for the fluid being treated. The impeller system 120 pulls fluid from the top duct 112 and discharges the fluid through the bottom duct 116. FIG. 1B illustrates the hydro turbulator system 100 in an up flow configuration. In the up flow configuration, the top duct 112 acts as an outlet for the hydro turbulator system 100 and the bottom duct 116 acts as an inlet for the hydro turbulator system 100. The impeller system 120 pulls water from the bottom duct 116 and pushes water out of the top duct 112. Whether in the down flow or the up flow configuration, the duct 112, 116 acting as the outlet may be positioned above fluid level, just below fluid level or one meter or more (e.g., four feet or more) below fluid level as required to support different applications of the hydro turbulator system 100.

A cross-sectional view of the hydro turbulator system 100 is shown in FIG. 2, so that the impeller system 120 may be seen in greater detail. The impeller system 120 includes a top bearing 121 and a bottom bearing 122. A total of three impellers are positioned between the top bearing 121 and the bottom bearing 122 as shown in FIG. 2. A top impeller 124 acts as a drive impeller when the hydro turbulator system 100 is in down flow and acts as a final agitation impeller when the hydro turbulator system 100 is in up flow. A middle impeller 125 serves as a first agitation impeller for both the down flow and the up flow configurations. A bottom impeller 126 acts as a final agitation impeller when the hydro turbulator system 100 is in down flow and acts as a drive impeller when the hydro turbulator system 100 is in up flow. The impeller system 120 also includes an impeller driveshaft 128 which, as already described above, is operatively connected to the motor shaft 142 of motor 140 at a coupling 132.

An impeller system 120 that includes multiple impellers produces high flow at low head and low horsepower for transferring, mixing, and aerating a source fluid while off gassing $CO_2$, VOCs, $H_2S$, and chlorine in water and wastewater to improve treatment performance. Flow within the hydro turbulator system 100 may be up to four times more fluid than a typical, high flow, low head centrifugal pump. Further, in some instances, the hydro turbulator system 100 may provide a minimum of 2 to 3 feet of piped lift.

In some embodiments, the top impeller may be mounted in a hyper turbulation position. When the hydro turbulator system 100 is operated in the up flow configuration and the top duct 112 is positioned to discharge fluid to a dry location, above the surface level of a source fluid, the top impeller operates in a flow lift area, creating hyper turbulation. Hyper turbulation significantly increases dissolved oxygen and produces a great amount of micro and small bubbles, as well as increasing aeration and off gassing of $CO_2$, VOCs, $H_2S$, chlorine, and other unstable water contaminants.

Although the impeller system 120 is shown with a total of three impellers in FIG. 2, in other embodiments, more or fewer impellers may be included as desired. As an example, the impeller system 120 may include only two impellers so that there is a drive impeller and a single agitation impeller. In another example, the impeller system 120 may include four impellers and include an additional agitation impeller. In a further example, the hydro turbulator system 100 may only include a single impeller, and the hydro turbulator system 100 is used to transfer and mix anaerobic wastewater without aeration to increase denitrification.

Figure 3:
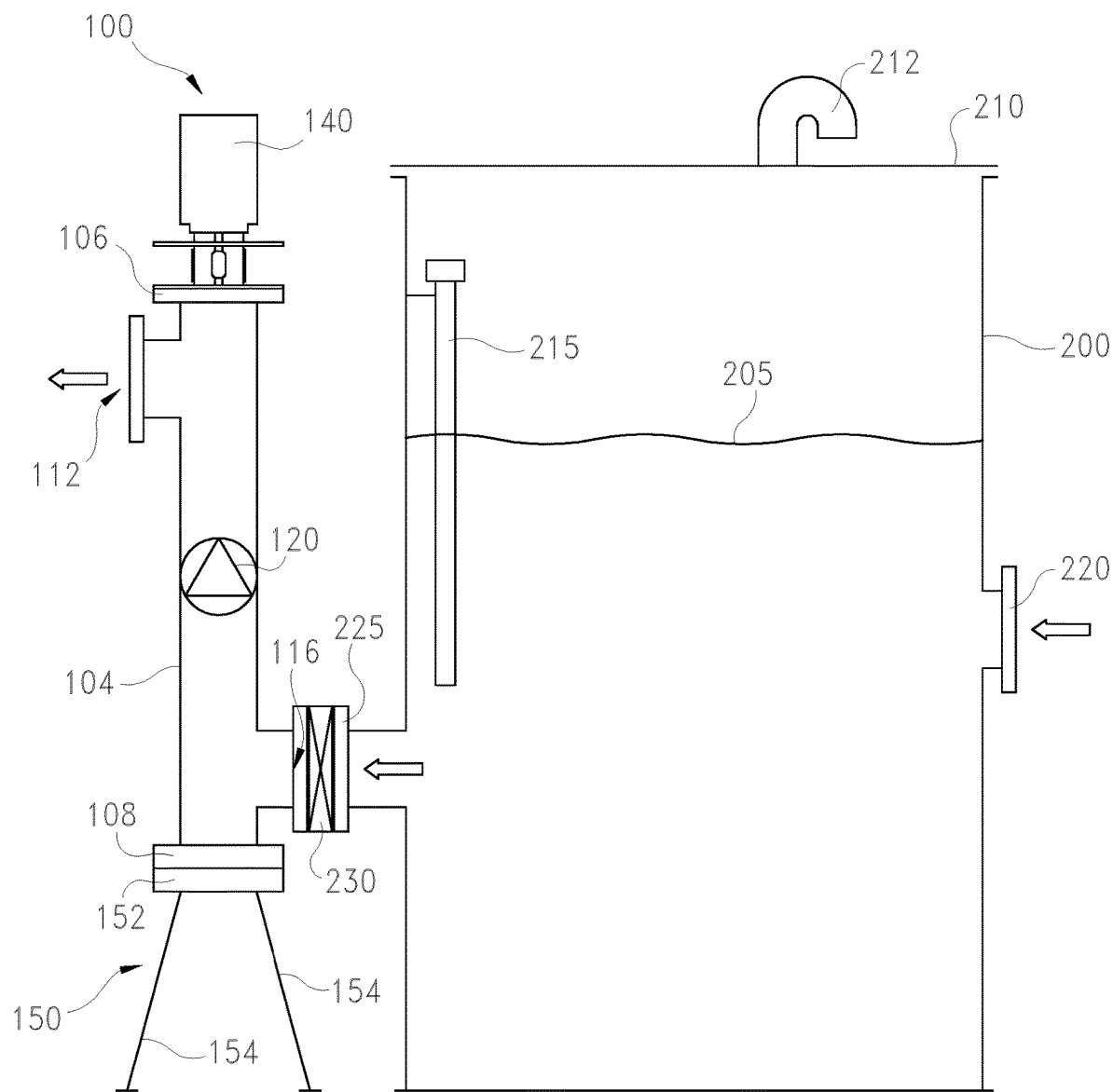
FIG. 3 is a diagrammatic view of a dry installation of the hydro turbulator system of FIG. 1B with a source fluid tank.

A dry installation of the hydro turbulator system 100 used for source fluid conditioning is illustrated in FIG. 3. The dry installation allows the hydro turbulator system 100 to be positioned outside of the fluid tank and to circulate and add oxygen to the fluid for the treatment process. A source fluid tank 200 holds a source fluid 205 to be treated in the hydro turbulator system 100. As an example, the source fluid may be source raw water that is to be preconditioned by the hydro turbulator system 100. The source fluid tank 200 includes a source tank cover 210 that covers the source fluid tank 200. An air vent 212 may be positioned on the source tank cover 210 to allow air to escape from the source fluid tank 200. A level control 215 is positioned within the source fluid tank 200 and is capable of metering the incoming source fluid to maintain a desired operating level within the source fluid tank 200.

The source fluid tank 200 includes a source tank inlet 220 which receives source fluid to be held within the source fluid tank 200. The source fluid tank 200 also includes a source tank outlet 225 which is in fluid communication with the bottom duct 116 of the hydro turbulator system 100. A tank turbulator valve 230 is positioned at the interface between the source tank outlet 225 and the bottom duct 116 to allow a user to control when source fluid from the source fluid tank 200 is provided to the hydro turbulator system 100. In some embodiments, the tank turbulator valve 230 may be an isolation valve, such as a gate valve. The aeration and off gassing of the source fluid performed by the hydro turbulator system 100 allows the source fluid to be transferred for further treatment or for other uses.

In the embodiment shown in FIG. 3, the hydro turbulator system 100 is arranged in the up flow configuration so that the bottom duct 116 acts as the inlet for the hydro turbulator system, and the top duct 112 acts as the outlet. As shown, the hydro turbulator system 100 may also include a mounting base extension 150 that may be used to adjust the height of the hydro turbulator system 100 so that the bottom duct 116 can align with the source tank outlet 225. The mounting base extension 150 may include a mounting base adapter 152 that provides support for the mounting base 108 and base legs 154 extending from the mounting base adapter 152. In some embodiments, discharge from the top duct 112 may be directed to a tank for treatment or to a pond, lagoon, wetland, drainage ditch, or other suitable location.

Figure 4:
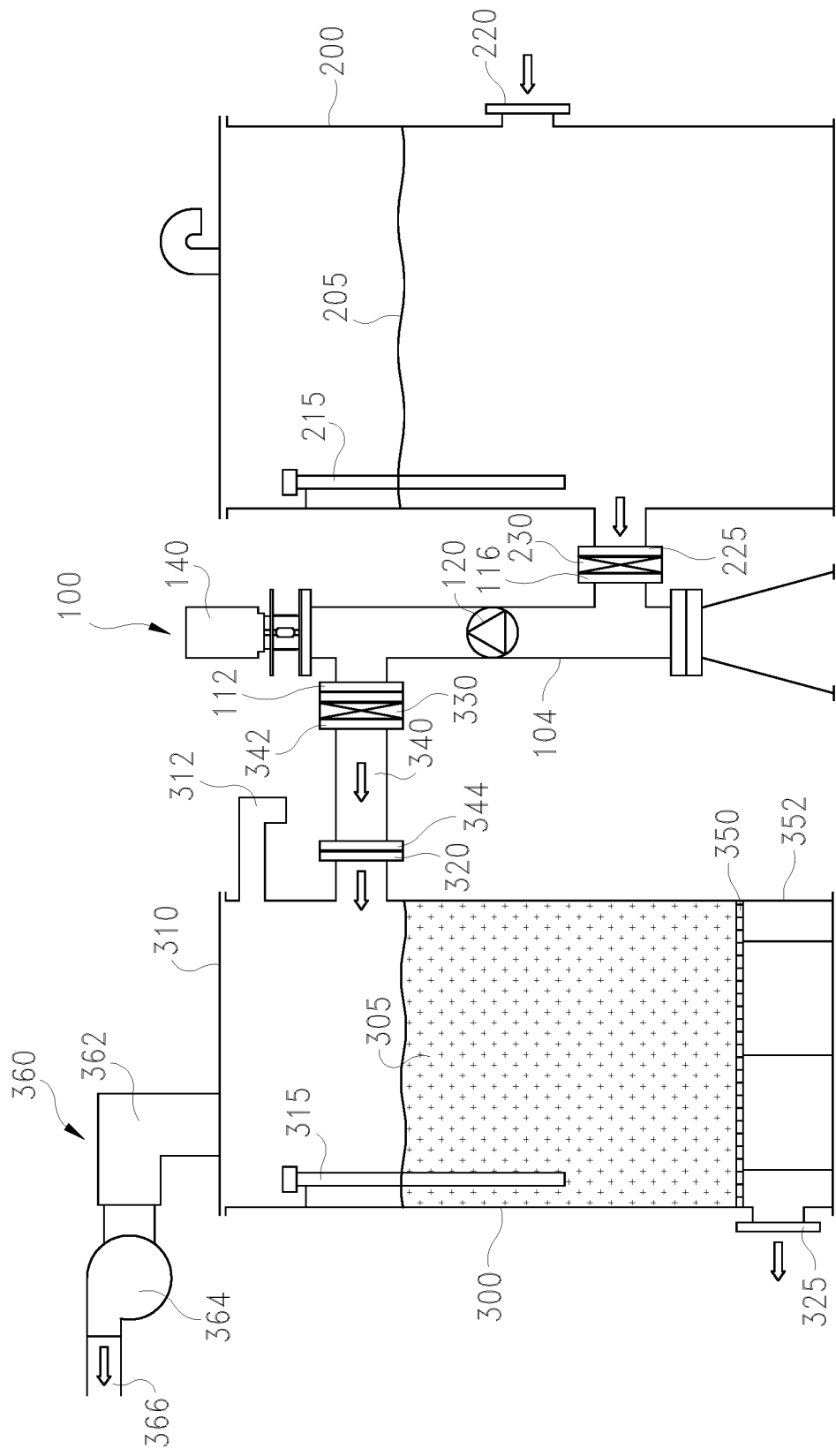
FIG. 4 is a diagrammatic view of the hydro turbulator system of FIG. 1B with the source fluid tank of FIG. 3 and a gas capture tank.

FIG. 4 shows a diagram of a dry installation of the hydro turbulator system 100 for source fluid preconditioning with the hydro turbulator system 100 discharging into a gas capture tank. The dry installation gas capture system shown in FIG. 4, includes the setup of the source fluid tank 200 and the hydro turbulator system 100 that is shown in FIG. 3 and also includes a gas capture tank 300.

The gas capture tank 300 includes a gas capture tank cover 310 that encloses the gas capture tank 300. A gas capture tank inlet 320 allows fluid that has been processed in the hydro turbulator system 100 to be introduced into the gas capture tank 300. A gas capture tank outlet 325 allows fluid within the gas capture tank 300 to be expelled from the gas capture tank 300 to a wetland, for reinjection, for reuse, or for any other desired purpose.

As shown in FIG. 4, a discharge extension spool 340 may be used to connect the top duct 112 of the hydro turbulator system 100 to the gas capture tank inlet 320. The discharge extension spool 340 may include an extension inlet 342 that is in fluid communication with the top duct 112. An isolation valve 330, such as a gate valve, may be positioned between the extension inlet 342 and the top duct 112 to allow fluid flow between the extension inlet 342 and the top duct 112 to be controlled. The discharge extension spool 340 may also include an extension outlet 344 that is in fluid communication with the gas capture tank inlet 320. In some embodiments, the discharge extension spool 340 may not be necessary, and the gas capture tank inlet 320 may be directly connected to the top duct 112 of the hydro turbulator system 100.

The gas capture tank 300 is filled with treatment media 305 that is capable of recovering the off gas VOCs that is released from the fluid that has been treated by the hydro turbulator system 100. A gas capture tank level control 315 may be included in the gas capture tank 300 to measure the level of the treatment media 305 and the fluid introduced from the hydro turbulator system. An induced ambient air inlet 312 is positioned in the top portion of the gas capture tank 300, near the gas capture tank cover 310. The induced ambient air inlet 312 allows ambient air to enter the gas capture tank 300 above the level of the treatment media 305.

The gas capture tank 300 includes a media support grate 350 as a base for supporting the treatment media 305. The media support grate 350 may be supported by vertical supports 352. Additionally, the media support grate 350 may be configured to allow the preconditioned fluid that is filtered through the treatment media 305 to pass through the media support grate 350. After passing through the media support grate 350, the preconditioned fluid may be discharged from the gas capture tank 300 through the gas capture tank outlet 325.

The gas capture tank 300 also includes a gas discharge system 360 that is coupled to the gas capture tank cover 310. The gas discharge system 360 includes a gas discharge inlet 362 that is in fluid communication with the gas capture tank 300 through the gas capture tank cover 310. The discharged gas enters the gas discharge inlet 362 and is passed to a gas discharge blower 364 that pumps the discharge gas through a gas discharge outlet 366 to a neutralization system if there are VOCs that need to be captured or to another suitable location.

In a raw water system, the gas capture tank 300 may be used for both aeration and off gassing of $CO_2$, $H_2S$, VOCs, and other gases. The microbubbles of rich oxygen raw water travel through the gas capture media and may be discharged through the gas capture tank outlet 325 at the bottom of the tank.

Figure 5:
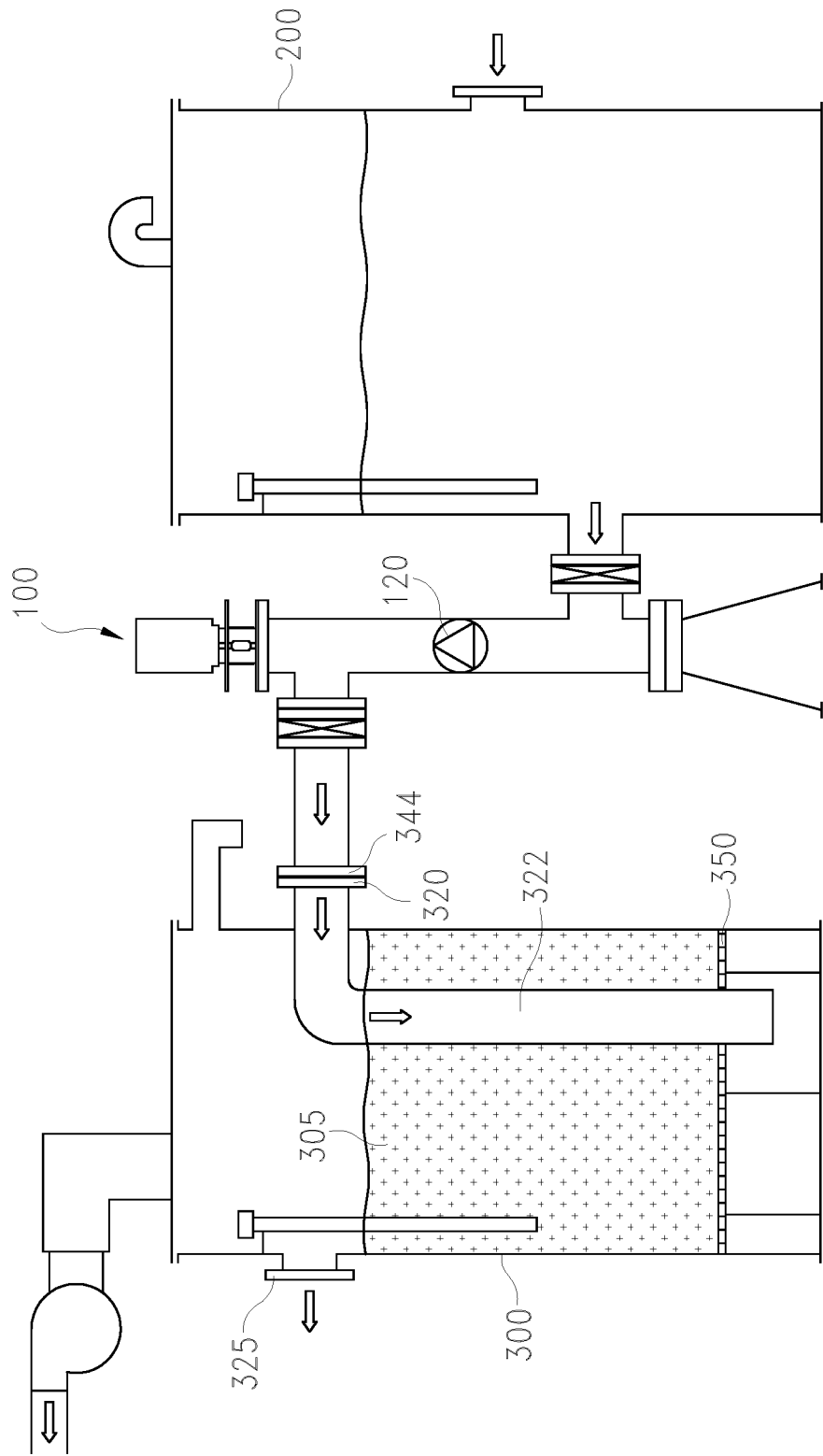
FIG. 5 is a diagrammatic view of the system of FIG. 4 with an extended discharge pipe from the hydro turbulator system.

FIG. 5 shows an alternative embodiment of a dry installation of the hydro turbulator system 100. In this embodiment, the gas capture tank inlet 320 includes a gas capture tank downcomer pipe 322 that extends downward, through the treatment media 305 and through the media support grate 350. The fluid from the source fluid tank 200 flows through the downcomer pipe 322 and is discharged below the media support grate 350 and out flows through the bottom space of the gas capture tank 300 to flow up through the treatment media 305 and then through the gas capture tank outlet 325, such as by gravity flow.

The additional length of provided by the downcomer pipe 322 further agitates the fluid discharged from the hydro turbulator system 100. The gas capture tank outlet 325 is moved from a position near the bottom of the gas capture tank 300 to a position that is closer to the top of the gas capture tank 300. In some embodiments, the position of the gas capture tank outlet 325 may be above the level of the wastewater and the treatment media 305.

Figure 6:
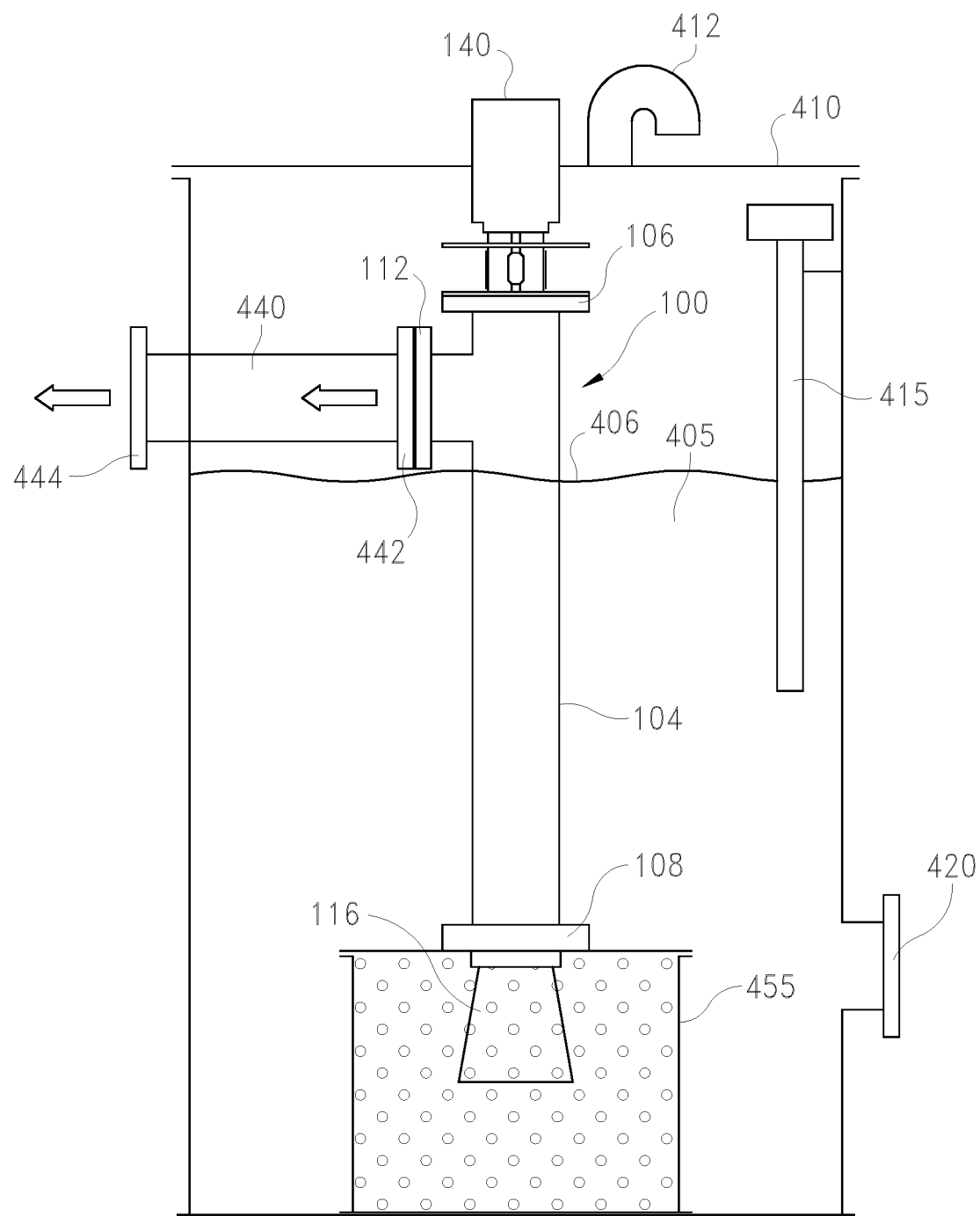
FIG. 6 is a diagrammatic view of the hydro turbulator system of FIG. 1B installed in a semi-submersible arrangement in a source treatment tank.

In an alternative embodiment, shown in FIG. 6, the hydro turbulator system 100 may be operated in a semi-submersible condition. In this embodiment, the hydro turbulator system is positioned at least partially within a source treatment tank 400 and a portion of the hydro turbulator system 100 is below the fluid level in the source treatment tank 400. The source treatment tank 400 holds a source fluid 405 that has a source fluid level 406 and is covered by a tank cover 410 with an air vent 412 defined through the tank cover 410. A level control 415 is positioned within the source treatment tank 400 to monitor the operating level of the source fluid 405 within the source treatment tank 400. A source fluid inlet 420 receives source fluid that is held within the source treatment tank 400.

In the embodiment shown in FIG. 6, the hydro turbulator system 100 operates in the up flow configuration, so that the bottom duct 116 of the hydro turbulator system 100 operates as an inlet for the hydro turbulator system 100. The bottom duct 116 is surrounded by a debris guard 455 that prevents large organic or inorganic materials from entering the hydro turbulator system 100. The debris guard 455 also acts as a support for the hydro turbulator system 100, as the mounting base 108 of the hydro turbulator system 100 rests on the debris guard 455. In some embodiments, the debris guard 455 may be integral to the hydro turbulator system 100.

A source treatment tank outlet extension 440 includes a hydro turbulator interface 442 that is in fluid communication with the top duct 112, which acts as an outlet when the hydro turbulator system 100 is in the up flow configuration. The source treatment tank outlet extension 440 also includes a tank outlet 444 that extends externally of the source treatment tank 400. In this embodiment, the top duct 112 of the hydro turbulator system and the tank outlet extension 440 are positioned above the source fluid level 406.

Figure 7:
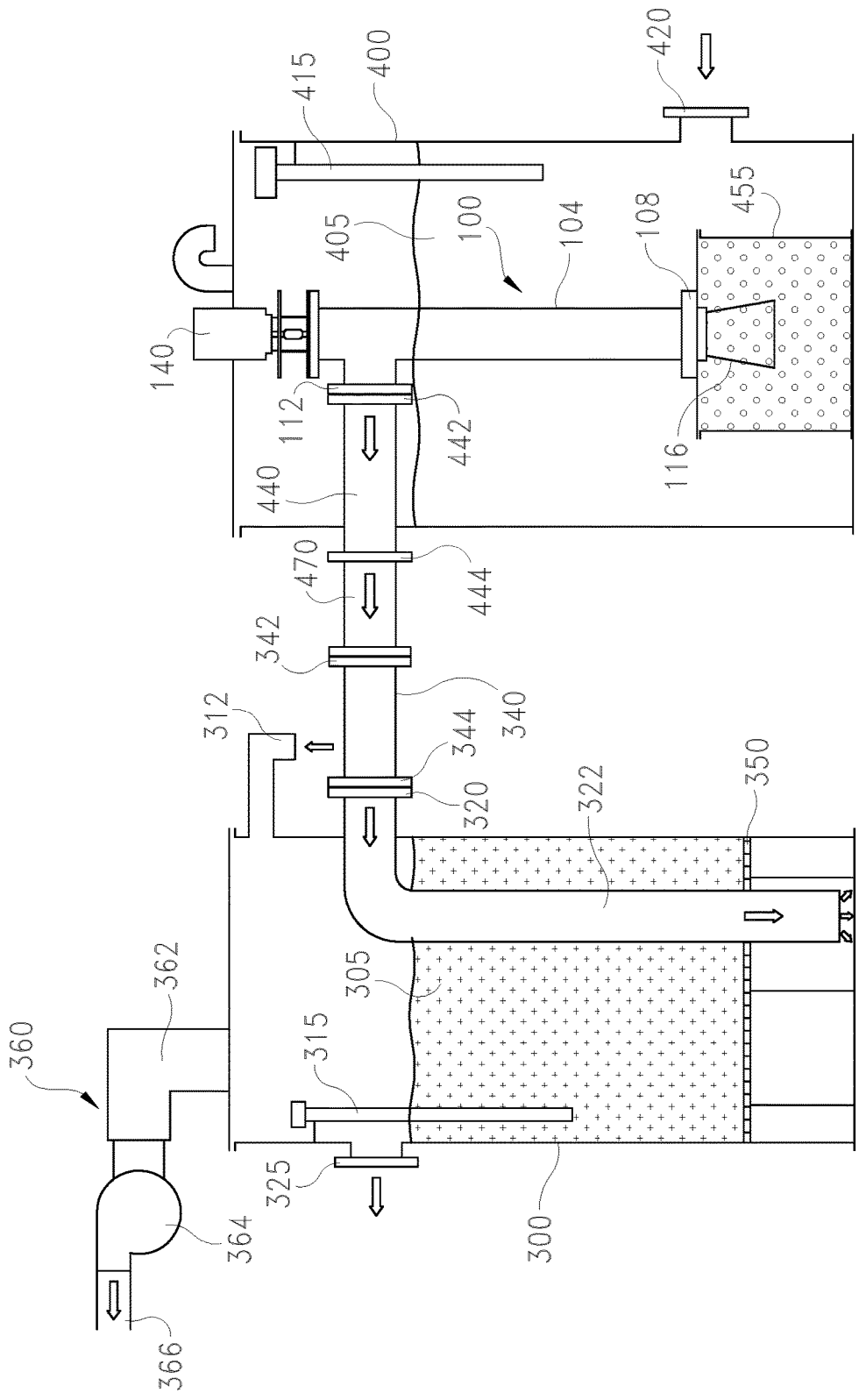
FIG. 7 is a diagrammatic view of the semi-submersible arrangement shown in FIG. 6 with a gas capture tank.

FIG. 7 illustrates the semi-submersible hydro turbulator system 100 shown in FIG. 6 used with the gas capture tank 300 shown in FIG. 5. As shown, the source treatment tank outlet extension 440 may be connected to a source treatment tank outlet extension 470 that is in fluid communication with the discharge extension spool 340. The discharge extension spool 340 connects to the gas capture tank inlet 320 and to the gas capture tank downcomer pipe 322 that extends through the treatment media 305. This allows the hydro turbulator system 100 to be removed and then reinstalled without disturbing the treatment media 305.

Figure 8:
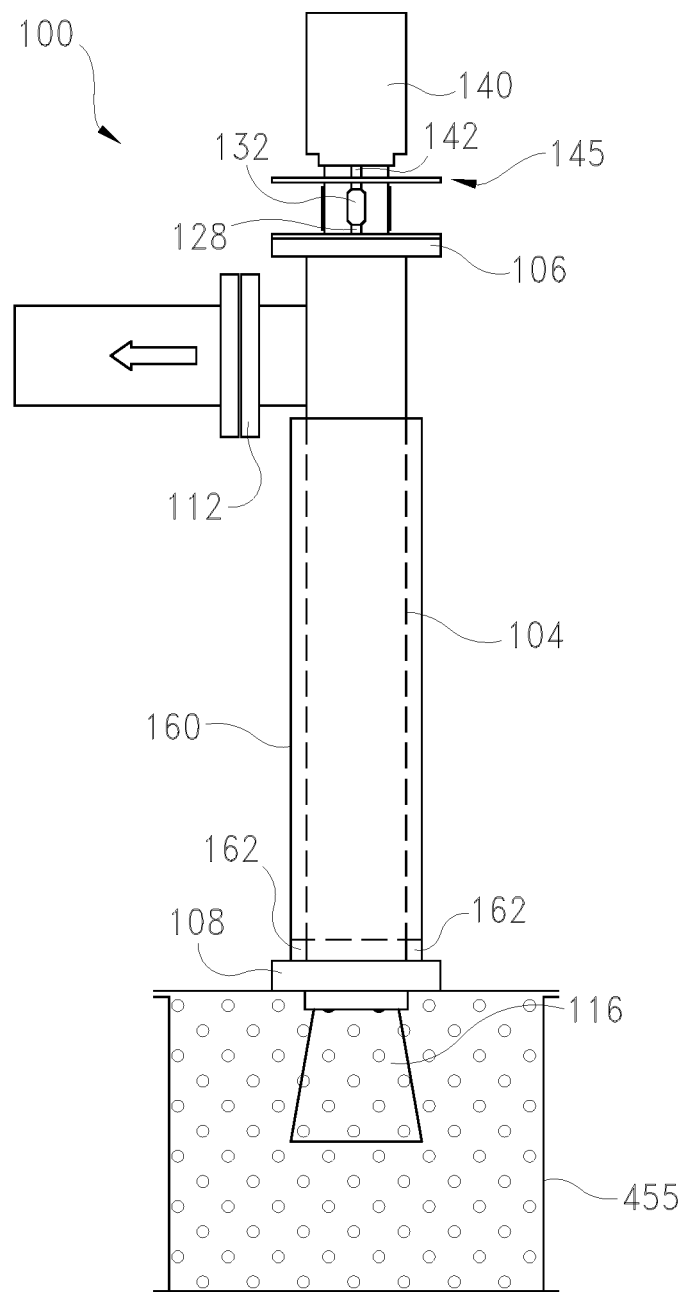
FIG. 8 is an embodiment of a hydro turbulator system installed within a casing.

An alternative embodiment of the hydro turbulator system 100 is shown in FIG. 8. In this embodiment, the hydro turbulator system 100 includes a casing 160 that surrounds the volute 104. An internal support base 162 is positioned within the casing 160 and rests on the mounting base 108 of the hydro turbulator system 100. The volute 104 is capable of sliding within the interior of the casing 160 to be inserted into or removed from the casing 160 as desired. When positioned within the casing 160, the volute is seated on the internal support base 162. The casing may include an open intake, allowing fluid to enter the volute 104.

Figure 9:
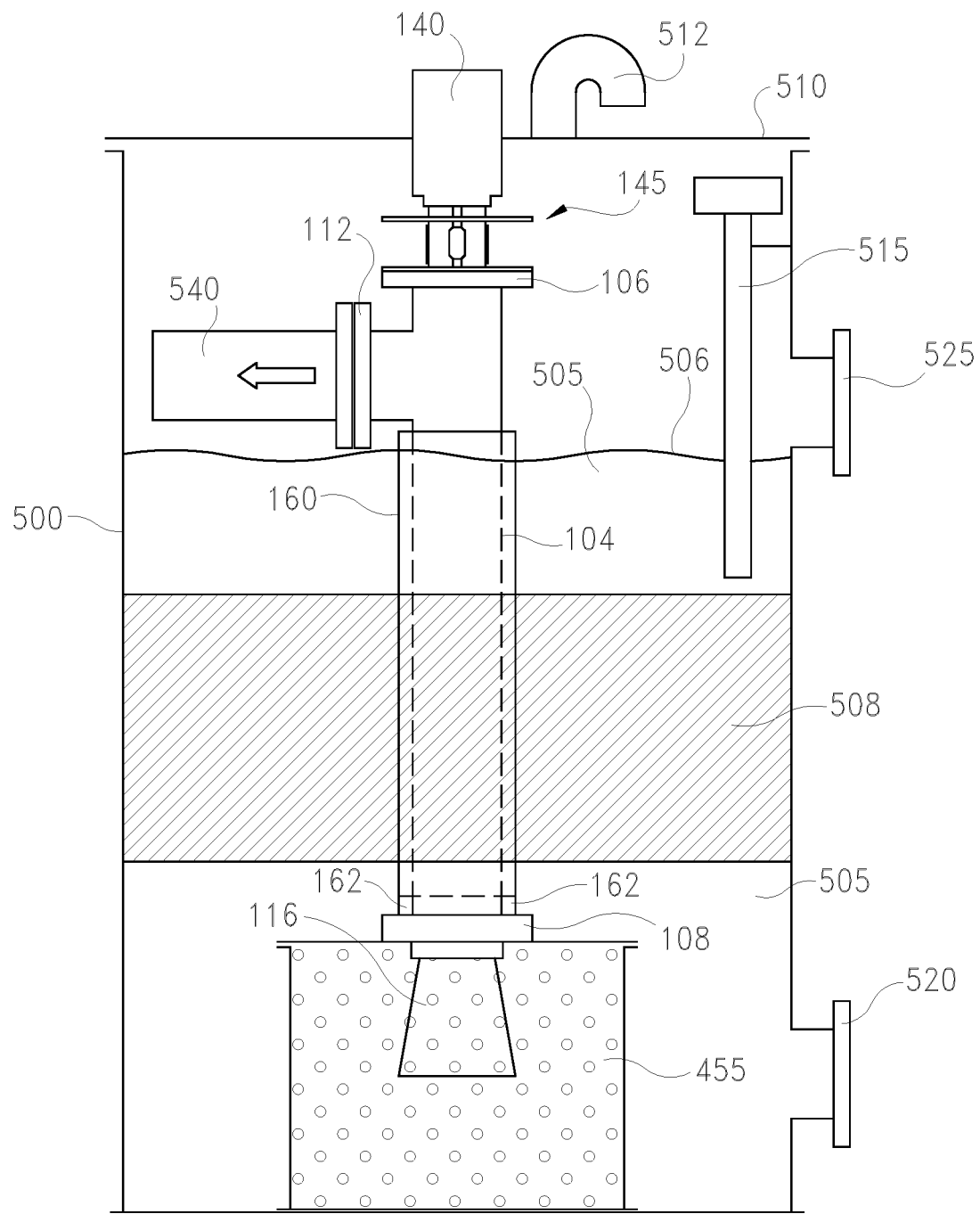
FIG. 9 is a diagrammatic view of the hydro turbulator system of FIG. 8 semi-submersed in a treatment tank including fixed treatment media.

In FIG. 9, the hydro turbulator system 100 including a casing 160 as illustrated in FIG. 8 is shown in use within a tank including fixed treatment media. The wastewater treatment tank 500 is filled with wastewater 505 and with a layer of fixed treatment media 508. The wastewater 505 has a wastewater level 506 within the wastewater treatment tank 500. A level control 515 may be positioned within the wastewater treatment tank 500 to measure and control the level of the wastewater 505. A wastewater tank cover 510 covers the wastewater treatment tank 500 and an air vent 512 allows air and gases within the wastewater treatment tank 500 to be expelled through the wastewater tank cover 510. A wastewater tank inlet 520 allows wastewater to enter the wastewater treatment tank 500 and a wastewater tank outlet 525 provides an outlet for the wastewater in the wastewater treatment tank 500. As shown in FIG. 9, the bottom of the wastewater tank outlet 525 may be aligned with the wastewater level 506.

The hydro turbulator system 100 is partially submerged in the wastewater 505 and the fixed treatment media 508 within the wastewater treatment tank 500. The hydro turbulator system 100 is supported on a debris guard 455 positioned within the wastewater treatment tank 500 and below the level of the fixed treatment media 508. The bottom duct 116 of the hydro turbulator system 100 acts as an inlet for the hydro turbulator system 100 and is surrounded by the debris guard 455. The hydro turbulator system discharges from the top duct 112, which is connected to a discharge extension spool 540 that will mix the upper level of the wastewater treatment tank 500 over the fixed treatment media 508. The casing 160 of the hydro turbulator system 100 runs through the fixed treatment media 508, allowing the volute 104 to be removed and reinstalled from the casing 160 without disturbing the treatment media 508.

Figure 10:
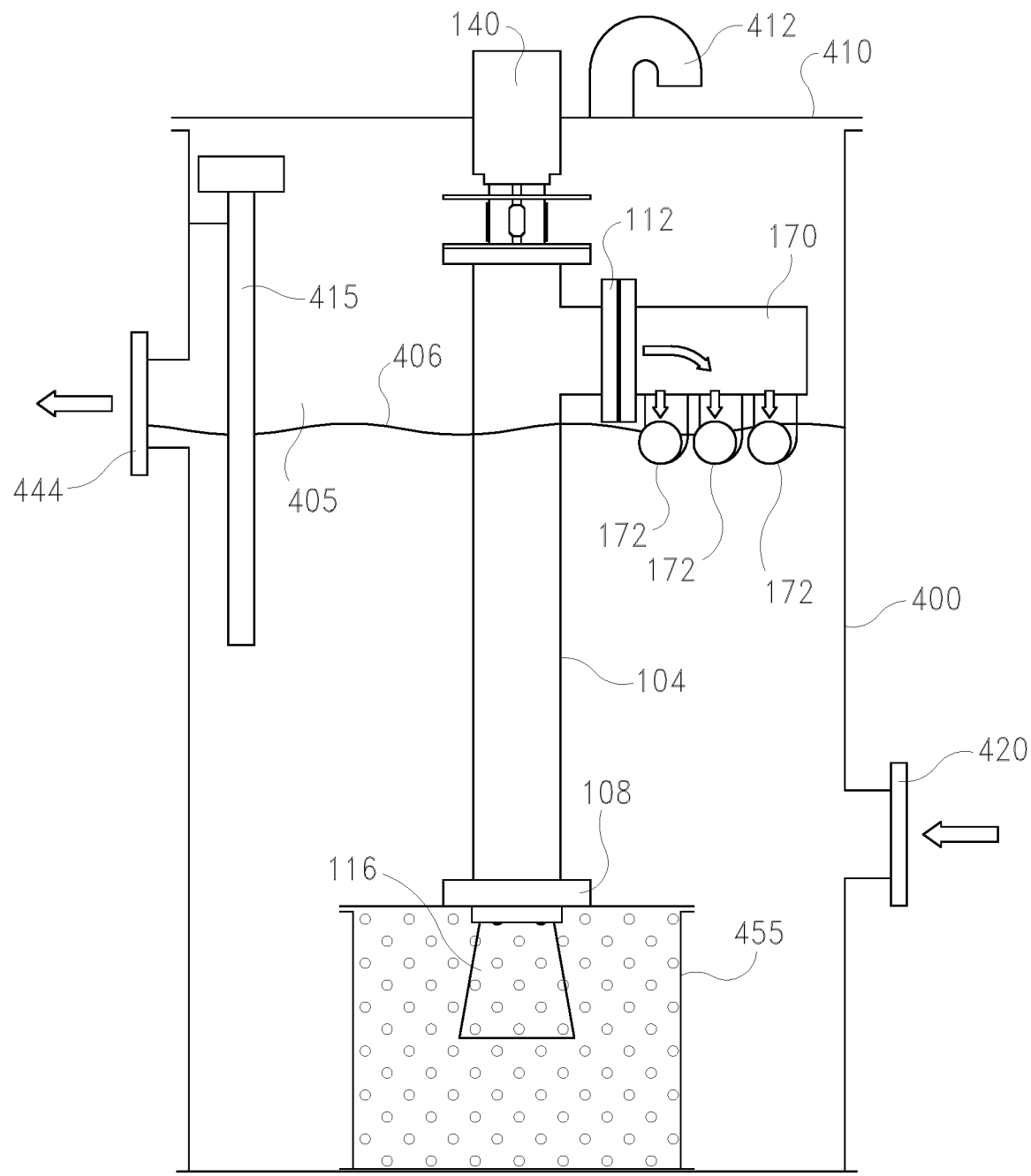
FIG. 10 is a diagrammatic view of the hydro turbulator system of FIG. 1B semi-submersed in a source treatment tank and including a turbulator discharge extension.

Another embodiment of a semi-submersible hydro turbulator system 100 is shown in FIG. 10. Similar to the embodiment shown in FIG. 6, the hydro turbulator system 100 is positioned at least partially within a source treatment tank 400. The source treatment tank 400 holds a source fluid 405 that has a fluid level 406 and is covered by a tank cover 410 with an air vent 412 defined through the tank cover 410. A level control 415 is positioned within the source treatment tank 400 to monitor the operating level of the source fluid 405 within the source treatment tank 400. A source fluid inlet 420 receives source fluid that is held within the source treatment tank 400.

A source treatment tank outlet 444 allows wastewater to be discharged by the source treatment tank 400. As shown, the source treatment tank outlet 444 is not directly connected to the hydro turbulator system 100. Additionally, the source fluid level 406 corresponds with the position of the source treatment tank outlet 444, so that the fluid level is above the bottom of the opening formed by the source treatment tank outlet 444, but below the top of the opening of the source treatment tank outlet 444.

In this embodiment, the hydro turbulator system 100 includes a turbulator discharge extension 170 that is coupled to the top duct 112 of the hydro turbulator system 100. The turbulator discharge extension 170 includes one or more discharge ports 172 from which fluid from the hydro turbulator system 100 may be discharged to further agitate and circulate the source fluid 405. In some embodiments, the source fluid 405 may also include a treatment media that is circulated by the hydro turbulator system 100 to improve performance.

The fluid level 406 of the source fluid 105 may be maintained at a level that is higher than the bottom edge of the source treatment tank outlet 444 to allow source fluid 405 to exit the source treatment tank 400. In some instances, the source fluid 405 in the source treatment tank 400 may be processed in a batch operation, where a single batch of source fluid 405 enters the source treatment tank 400 and is conditioned before being drained from the source treatment tank 400 before new source fluid 405 is introduced. In other instances, the source fluid 405 may be processed in a continuous operation where source fluid 405 is constantly being introduced into the source treatment tank 400, conditioned by the hydro turbulator system 100 and then drained while additional source fluid 405 is added to the source treatment tank 400. The operation of the hydro turbulator system 100 on the source fluid 405 depends on the control of the flow through the source fluid inlet 420 and the source treatment tank outlet 444.

Figure 11:
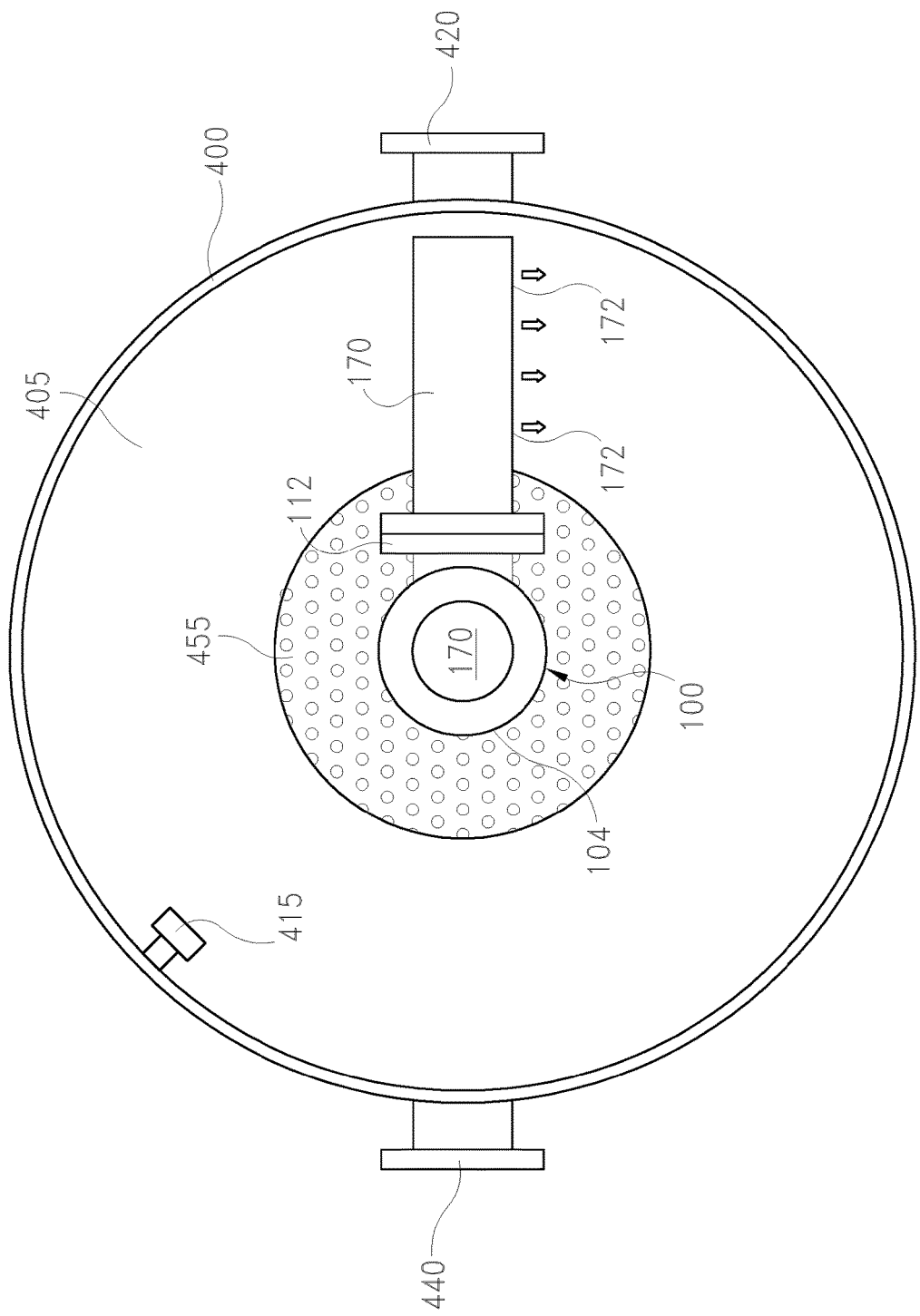
FIG. 11 is a top view of a round source treatment tank with the hydro turbulator system of FIG. 10.

A top view of the embodiment of the hydro turbulator system 100 and the source treatment tank 400 from FIG. 10 is shown in FIG. 11. As illustrated, the hydro turbulator system 100 sits near the center of the source treatment tank 400. The hydro turbulator system 100 is surrounded by wastewater held in the source treatment tank 400. A treatment media, such as a moving bed biofilm reactor (MBBR), floats in the tank surrounding the hydro turbulator system 100. Discharge from the hydro turbulator system 100 is expelled from the discharge ports 172 located in the discharge extension 170 to help circulate the treatment media in the source fluid 405 in a circular pattern around the tank while also adding aeration and microbubbles that mixes the treatment media to improve treatment.

Figure 12:
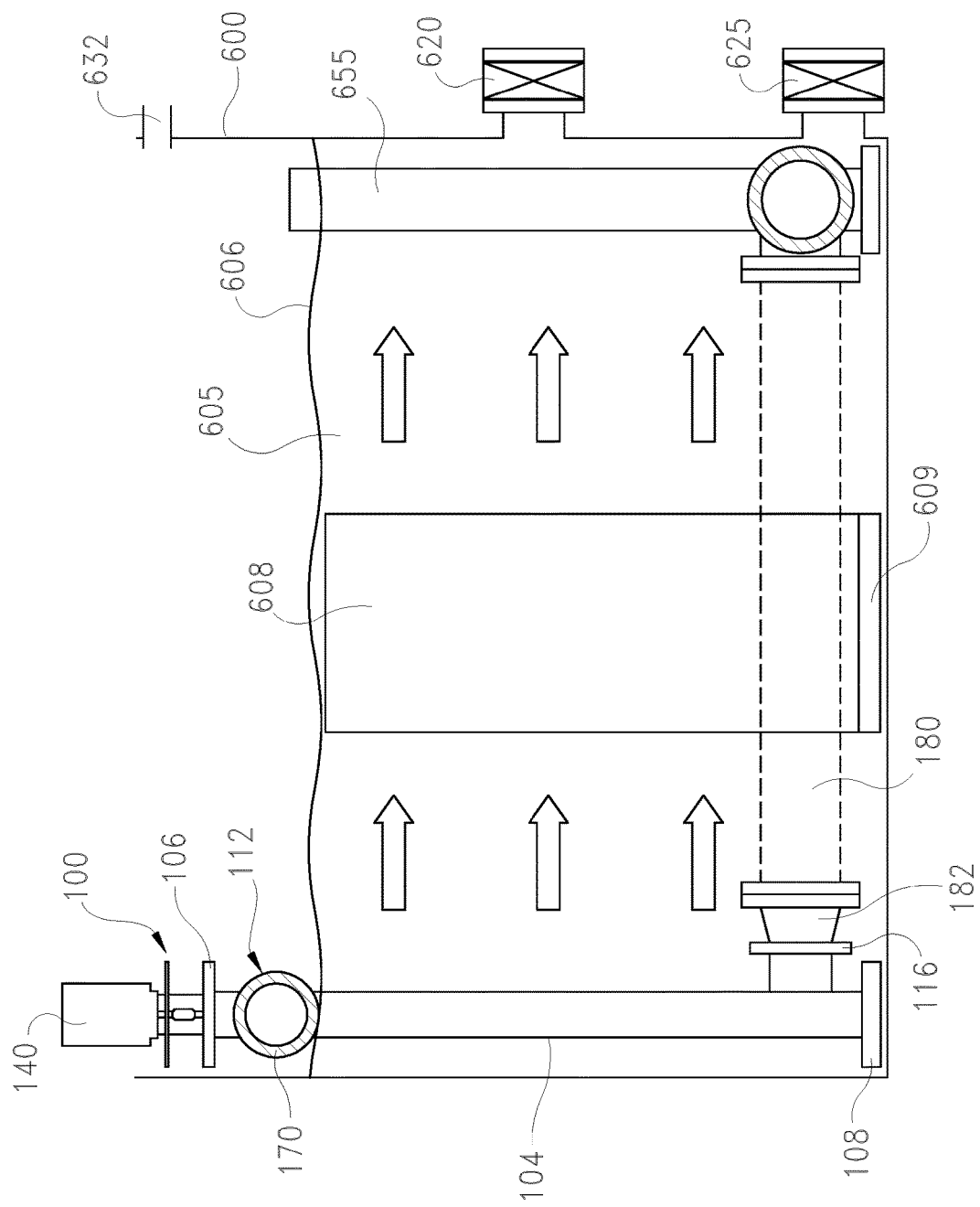
FIG. 12 is an elevation side view of the hydro turbulator system of FIG. 1B providing crossflow to treatment media in a rectangular treatment tank.

An elevation side view of an alternative embodiment including the hydro turbulator system 100 installed in a rectangular treatment tank 600 is illustrated in FIG. 12. Wastewater 605 is held within the treatment tank 600 to the height of a wastewater level 606. A level control 615 (see FIG. 13) may be used to monitor and control the wastewater level 606. The rectangular treatment tank 600 includes a treatment tank inlet 620 for allowing wastewater to enter the treatment tank 600 and a treatment tank outlet 625 for allowing wastewater to be discharged from the treatment tank 600. Fixed treatment media 608, such as a membrane bioreactor (MBR), is positioned within the treatment tank 600 and supported by a treatment media support 609. The treatment tank 600 may also include an overflow valve 632 to allow excess wastewater 605 to be removed from the treatment tank 600 when the wastewater level 606 gets too high.

A suction pipe increaser 182 is attached to the bottom duct 116, acting as inlet, of the hydro turbulator system 100. A suction extension pipe 180 is connected to the suction pipe increaser 182 and extends between the hydro turbulator system 100 and debris guard apparatus 655 positioned within the treatment tank 600. This piping system creates flow through the fixed treatment media 608 using discharge flow to push through the fixed treatment media 608 and suction to pull wastewater through the fixed treatment media 608.

Figure 13:
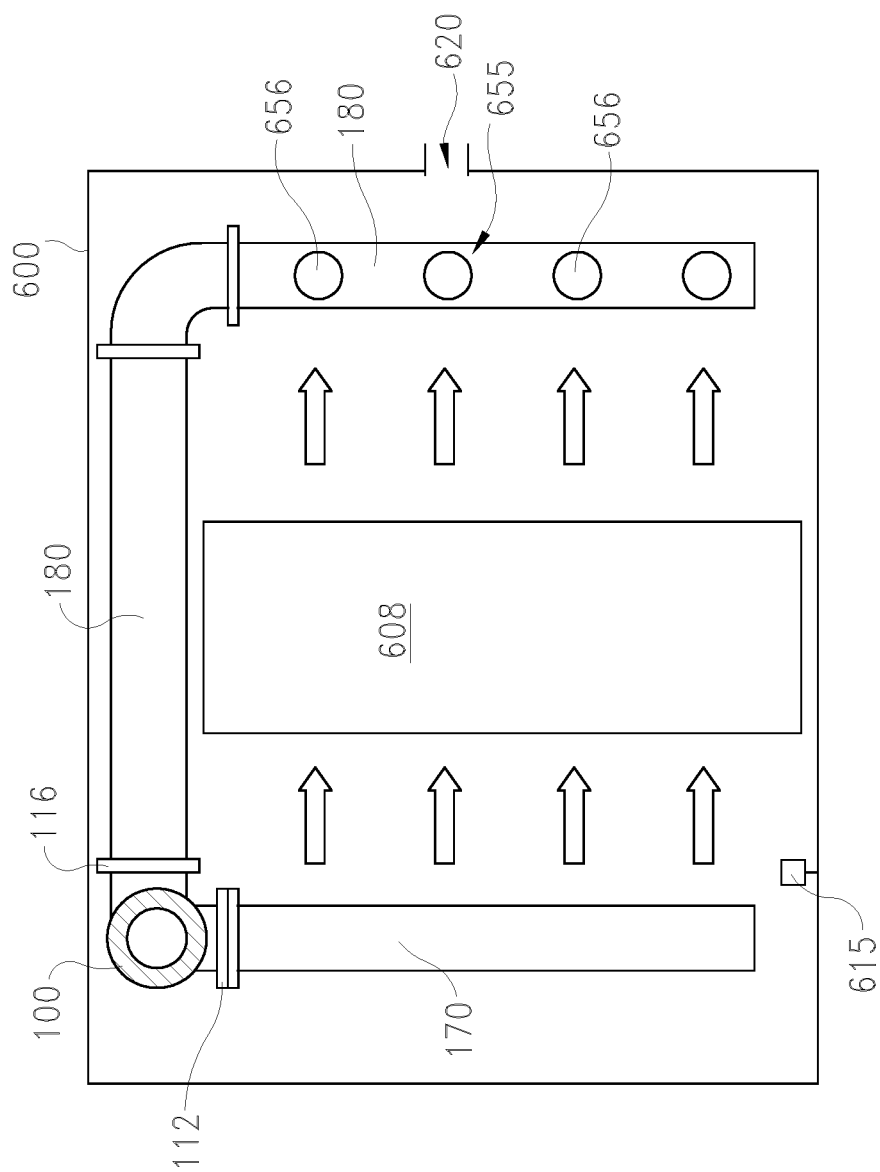
FIG. 13 is a top view of the hydro turbulator system and treatment tank of FIG. 12.

FIG. 13 is a top view of treatment tank 600 illustrated in FIG. 12. As shown, the hydro turbulator system 100 is positioned near a corner of the treatment tank 600. The discharge extension 170 extends along on wall of the treatment tank 600. The suction extension pipe 180 initially extends along another wall of the treatment tank, perpendicular to the discharge extension 170. The suction extension pipe 180 then makes an approximately 90 degree turn to follow the wall of the treatment tank 60 opposite to the wall along which the discharge extension 170 extends so that the a portion of the suction extension pipe 180 is parallel to the discharge extension 170. Fluid is discharged from the discharge extension 170 so that it flows through the fixed treatment media and to the suction extension pipe 180. One or more debris guard pipes 656 of the debris guard apparatus 655 extend from the suction extension pipe 180.

Figure 14:
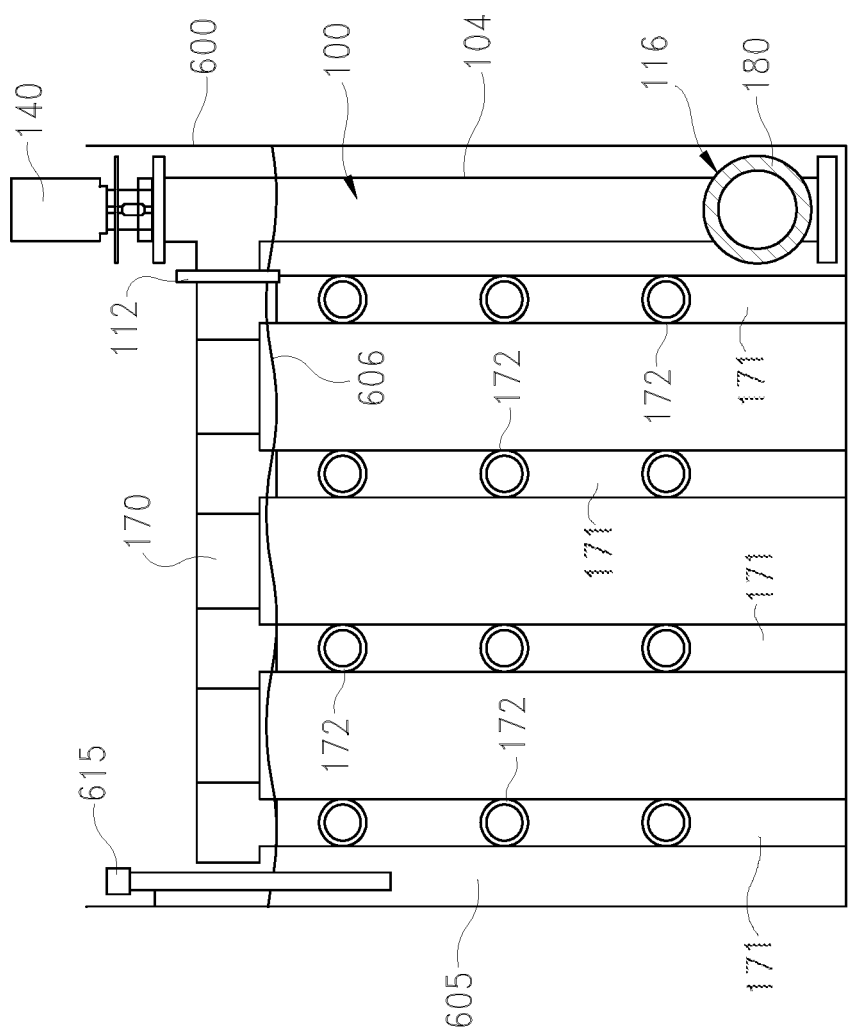
FIG. 14 is a cross-sectional elevation end view of the hydro turbulator system and treatment tank of FIG. 12.

FIG. 14 shows a cross-sectional elevation view of the rectangular treatment tank 600 shown in FIG. 12. This view shows the end of the rectangular treatment tank 600 that includes the hydro turbulator system 100. Since the hydro turbulator system 100 is operating in up flow, the top duct 112 acts as an outlet for the hydro turbulator system 100. As shown, the discharge extension 170 extends from the top duct 112 of the hydro turbulator system 100 near or above the wastewater level 606 in the treatment tank 600. One or more discharge pipe downcomers 171 extend vertically from the discharge extension toward the bottom of the treatment tank 600. A series of discharge ports 172 are positioned on the discharge pipe downcomers 171 and are in fluid communication with the discharge extension 170. Fluid from the discharge extension 170 is expelled from the discharge ports 172, allowing fluid that has been processed through the hydro turbulator system to be recirculated in the treatment tank 600.

FIG. 15 is a cross-sectional elevation view of the opposite end of the rectangular treatment tank 600 than the end shown in FIG. 14 is illustrated in FIG. 15. This view shows the end of the rectangular treatment tank 600 (see FIG. 12) that includes the debris guard apparatus 655. As shown, the suction extension pipe 180 extends near the bottom surface of the treatment tank 600 and debris guard pipes 656 of the debris guard apparatus 655 extend vertically from the suction extension pipe 180. The debris guard pipes 656 prevent large pieces of debris from being suctioned into the suction extension pipe 180 and being returned into the hydro turbulator system 100.

Figure 16A:
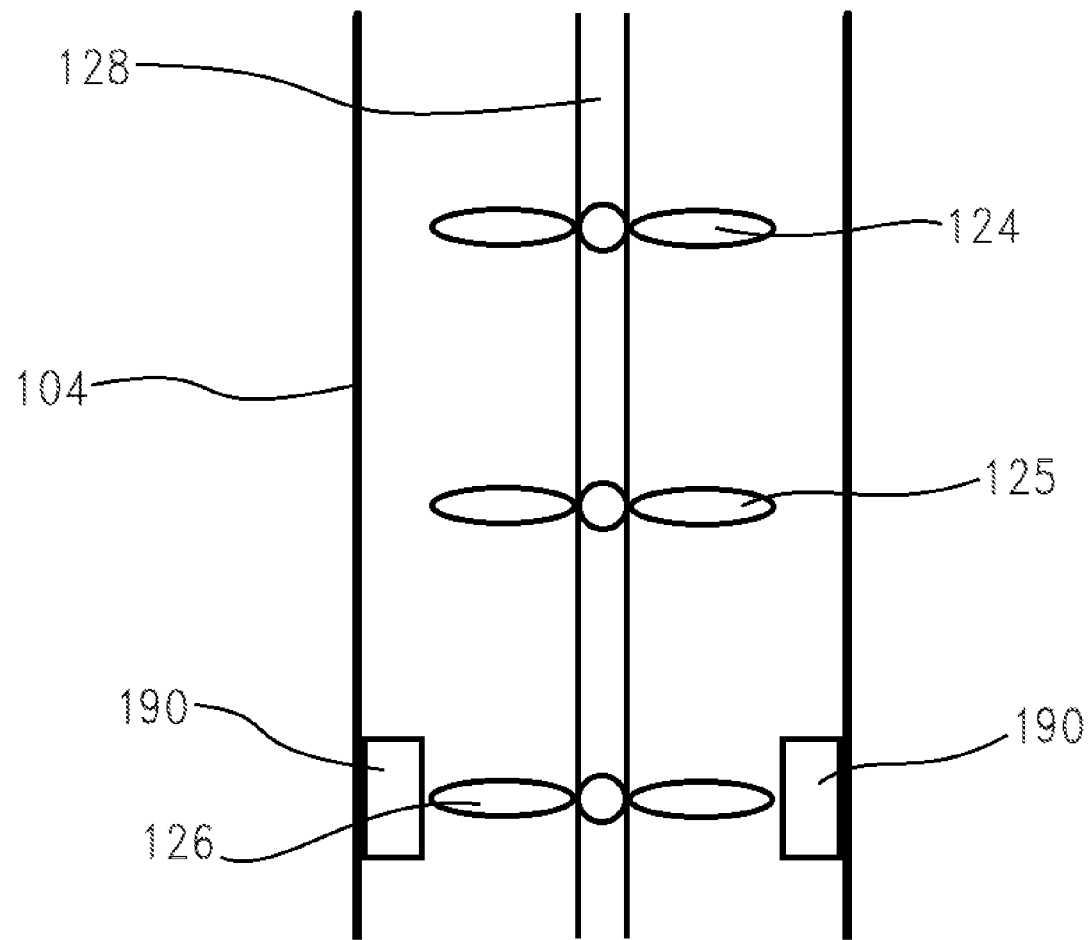
FIG. 16A is a diagrammatic view of the impeller system from the hydro turbulator system of FIG. 1B including a ring within the volute.

An exemplary impeller system 120 and section of volute 104 suitable for any of the embodiments disclosed herein is shown in FIG. 16A. This system includes drive impeller 126 and one or more agitations impellers 124 and/or 125. As shown, a ring 190 may be installed within the volute 104 near the position of the drive impeller 126 to decrease the hydraulic diameter near the drive impeller 126. This allows for efficient flow of fluid through the hydro turbulator system 100. In contrast to the drive impeller 126, there is no ring 190 near the first agitation impeller 124 and/or the second agitation impeller 125 so that there is a greater space between the blade ends of the first agitation impeller 124 and the second agitation impeller 125 and the walls of the volute 104 than between the blade ends of the drive impeller 126 and the ring 190. This open space between the top impeller 124 and the middle impeller 125 and the walls of the volute 104 allows for greater agitation (e.g., vortex flow radially outward of the impeller blades) of the fluid proximate the impellers 124, 125.

Figure 16B:
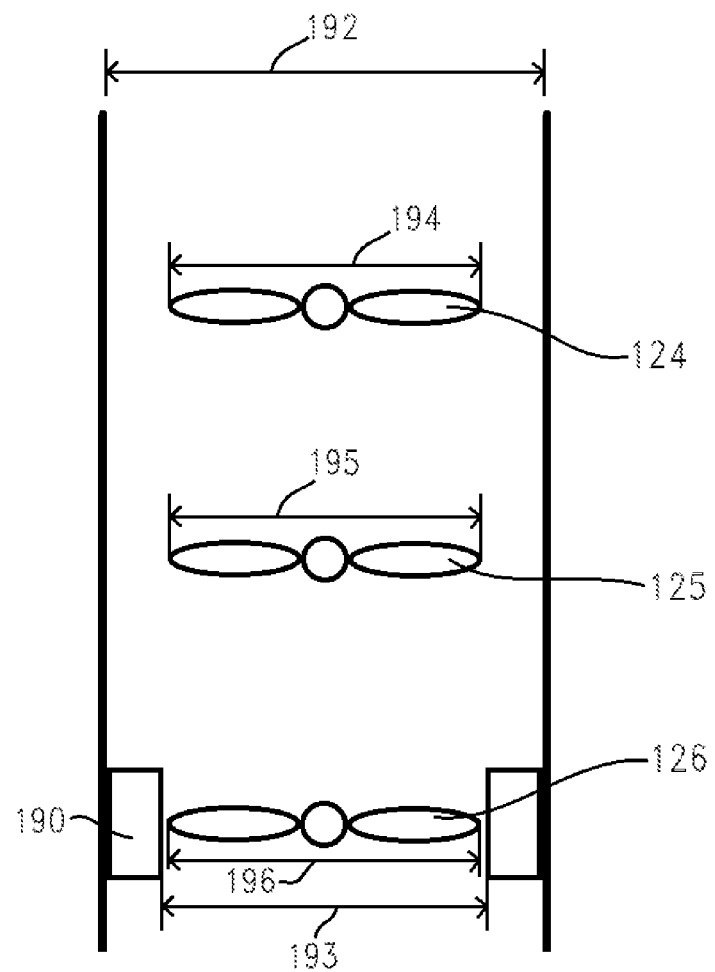
FIG. 16B is a diagrammatic view of the impeller system of FIG. 16A with various defined diameters.

As illustrated in FIG. 16B, a fluid flow path through the impeller system and volute may have a constant or varying hydraulic diameter along portions of its length. At some portions, the hydraulic diameter may be equal to a volute wall diameter 192 that spans the walls of the volute 104. In other portions, the hydraulic diameter may be equal to a ring diameter 193 that is defined between surfaces of a ring 190 that is inserted within the volute 104 near the drive impeller 126. In such instances, because the ring 190 is inserted within the volute 104, the hydraulic diameter at the ring (e.g., the ring diameter 193) may be less than the hydraulic diameter of the volute (e.g., the volute diameter 192).

In addition to the one or more hydraulic diameters along the length of the fluid flow path through the impeller system and volute, each of the impellers 124, 125, 126 has a diameter defined by the span of the blades of the impeller 124, 125, 126. The first impeller 124 defines a first agitation impeller diameter 194. The second agitation impeller 125 defines a second impeller diameter 195. And, the drive impeller 126 defines a drive impeller diameter 196. In some embodiments, each of the impeller diameters 194, 195, 196 may be equal. However, in other embodiments, the impeller diameters 194, 195, 196 may be varied so that each impeller diameter is different or so that two of the impeller diameters are the same and one of the impeller diameters is varied.

Preferably, the drive impeller diameter 196 is slightly less than, but almost equal to the hydraulic diameter of the fluid flow path at the location of the drive impeller (e.g., the ring diameter 193). In some embodiments, the ratio of the drive impeller diameter 196 to the hydraulic diameter is greater than 90% and preferably greater than 95%. Also preferably, the ratio of the first agitation impeller diameter 194 to the hydraulic diameter of the fluid flow path at the location of the first agitation impeller and/or the ratio of the second agitation impeller diameter 125 to the hydraulic diameter of the fluid flow path at the location of the second agitation impeller is/are less than the ratio of the drive impeller diameter 196 to the hydraulic diameter of the fluid flow path at the location of the drive impeller. In one example, the ratio of the first agitation impeller diameter 194 to the hydraulic diameter at the location of the first agitation impeller and/or the ratio of the second agitation impeller diameter 125 to the hydraulic diameter at the location of the second agitation impeller are each less than 90% and preferably less than 80%. For example, the first and/or second agitation impellers may have a diameter of about 150 mm and the hydraulic diameter at those locations may be about 200 mm, for a ratio of about 75%. Additionally or alternatively, the drive impeller may have a diameter of about 150 mm and the hydraulic diameter at the location of the drive impeller may be about 160 mm for a ratio of about 94%.

In some embodiments, the hydro turbulator system 100 may not include a ring 190. Instead, the drive impeller 126 may be bigger than the first agitation impeller 124 and/or the second agitation impeller 125 so that the ratio of the drive impeller diameter 196 to the hydraulic diameter is greater than that of the agitation impeller(s). In some examples, the ratio of the drive impeller diameter 196 to the hydraulic diameter wall may be at least 90%, 90% to 95%, or, in some instances, greater than 95%. In other embodiments, instead of using a ring 190, the hydraulic diameter may be decreased near the drive impeller 126 by a reduced volute wall diameter 192 at the location of the drive impeller 126 than at the first agitation impeller 124 and/or the second agitation impeller 125. In these embodiments, the hydraulic diameter may remain equal to the volute wall diameter 192 throughout the length of the volute, but the volute wall diameter 192 varies.

In some embodiments, one or more of impellers 124, 125, and/or 126 may have blades with a different pitch angle than blades of another one of impellers 124, 125, and/or 126. As an example, the pitch of the drive impeller 126 may be greater than the pitch of the first agitation impeller 124 and/or the second agitation impeller 125. For example, the drive impeller 126 may have a lower pitch angle than that of the first agitation impeller 124 and/or the second agitation impeller 125. Advantageously, such an arrangement can reduce the static fluid pressure in a portion of the fluid flow path between the drive impeller and the one or more agitation impellers to a point below the vapor pressure of the fluid, so as to induce cavitation (e.g., boiling) in the reduced-pressure region. Alternatively, the drive impeller may have a greater pitch angle than the first and/or second agitations impellers so as to, for example, provide back-pressure on the drive impeller and/or induce more cavitation downstream of the one or more agitation impellers. As explained above, the agitation impeller(s) preferably cause cavitation which can promote the off-gas of volatile chemicals from the liquid.

One or more of impellers 124, 125, and/or 126 may differ from another one of impellers 124, 125, and/or 126 in terms of diameter, material, blade chord length, rake, cupping, type of pitch (true vs. progressive) and/or number of blades.

FIG. 16A and FIG. 16B and the accompanying description are suitable for a hydro turbulator system 100 in the up flow configuration and/or in the down flow configuration.

Although embodiments described above may include an enclosed treatment tank, the hydro turbulator system 100 may also be operated in an open body of water such as a pond, lake, or a lagoon. The hydro turbulator system 100 may float on the surface of the water or be mounted in a fixed position within the body of water. In a lagoon wastewater system, the hydro turbulator system may provide cell to cell transfer.

As already described, for example in FIGS. 3-7, in some embodiments, the hydro turbulator system 100 may operate as a once-through system. In one example the hydro turbulator system 100 may act as a dissolved oxygen return. The hydro turbulator system 100 floats or is permanently installed near the leaving effluent location in a lagoon treatment system. The hydro turbulator system 100 is operated in the up flow configuration and transfers dissolved oxygen rich effluent from the final stage of the treatment system to a piped discharge area near the location of the incoming wastewater for treatment. The hydro turbulator system 100 can transfer, mix, aerate and increase the dissolved oxygen level to improve the treatment process and increase wastewater contact time and travel velocity in the lagoon treatment system.

In another once-through application, the hydro turbulator system 100 operates to provide off gas and aeration for source fluid and/or rain water. The hydro turbulator system 100 may be operated in hyper turbulation mode and applied for groundwater or surface water remediation for contaminated water or for raw water pretreatment in a potable water treatment plant. The hydro turbulator system 100 off gases $CO_2$, VOCs, and $H_2S$ while mixing and generating oxygen rich micro bubbles for aeration. The hydro turbulator system 100 may transfer and discharge conditioned water into a holding tank that may or may not include filtering media to help strip $CO_2$, VOCs, and $H_2S$ for capture and air treatment of the off gas.

In another application, one or more hydro turbulator systems 100 may be installed in a floating assembly and moved over a pond, lake, or lagoon with high levels of sludge or biological growth that has caused the water and or wastewater in the pond, lake, or lagoon to become anaerobic. The hydro turbulator systems 100 may be semi-submersed and configured in either an up flow configuration horizontally and/or straight down to blast, mix, and aerate the water or sludge to increase biological treatment performance.

The hydro turbulator system 100 may also be used in recirculation applications, as shown, for example, in FIGS. 10-15. In one embodiment, the hydro turbulator system 100 may be installed in a round or rectangular, in ground or above ground, metal, composite, or concrete tank. The recirculating system may be used for treatment and the hydro turbulator system 100 may work with and complement the treatment media that is used in the treatment process. The inlet of the hydro turbulator system 100 is connected to the debris guard and acts in suction to draw in the source fluid. The outlet of the hydro turbulator system 100 may include piping and multiple piped outlets to mix the source fluid while providing aeration and increased dissolved oxygen for improved treatment performance.

For above ground tanks, the hydro turbulator system 100 may be applied dry and external, but close coupled to the tank. The hydro turbulator system may alternatively be configured in up flow and mounted inside the treatment tank for discharge to mix and/or aerate the floating treatment media, such as MBBR. A circular tank with a centrally located debris guard and one or more hydro turbulator systems 100 with discharge piping and nozzles configured may be used to promote a circular flow for mixing the aerated discharge, supplying increased dissolved oxygen to improve treatment efficiency.

In some embodiments, multiple hydro turbulator systems 100 may be used within a large rectangular tank and partitions and/or separation screens may be used to increase the travel distance for improved treatment performance.

The tanks used for recirculation may include fixed media, MBR, or flowing sheet media to treat the source fluid or wastewater processed in the tank. The media may benefit from the push and pull of the aerated flow of the fluid within the tank and through the media. The hydro turbulator system 100 provides piped and submerged suction that pulls from one side of the media and provides discharge outflow flowing directly into the media, aerating the treatment microbes in the media. The suction and discharge flows may be arranged in crossflow, horizontal through the media; down flow, flowing downward through the media with microbubbles; or in up flow, flowing upward through the media with bubbles.

In some embodiments, where source fluid or wastewater to be treated is heavily contaminated, two or more hydro turbulator system 100 may be piped in series with a transfer tank between the hydro turbulator systems 100. A speed and level control system may be used to maintain the flow through entire system at about 600 gallons per minute.

The following numbered clauses set out specific embodiments that may be useful in understanding the present invention:

1. A hydro turbulator system comprising:
   a volute including a length, wherein said volute includes a first duct and a second duct, and wherein one of said first duct and said second duct are configured to allow fluid to enter the volute and the other is configured to allow fluid to exit the volute;
   an impeller system positioned within the volute wherein said impeller system includes a drive impeller having a diameter and a first agitation impeller having a diameter;
   wherein said drive impeller and said first agitation impeller are positioned in series along a fluid flow path extending through the volute between the first duct and the second duct, and wherein rotation of said drive impeller and said first agitation impeller create successive zones of high pressure and low pressure along a length of the fluid flow path;
   one or more motors operationally connected to said impeller system, wherein operation of the one or more motors is configured to rotate the drive impeller and the first agitation impeller; and
   i. wherein a ratio of the diameter of the drive impeller to a hydraulic diameter of the fluid flow path at the drive impeller is greater than a ratio of the diameter of the first agitation impeller to a hydraulic diameter of the fluid flow path at the first agitation impeller, or
   ii. wherein the drive impeller differs from the first agitation impeller by diameter, blade pitch, and/or number of blades.
2. The hydro turbulator system of clause 1, further comprising:
   a ring positioned within the volute around the drive impeller; and wherein said ring defines the hydraulic diameter at the drive impeller.
3. The hydro turbulator system of any preceding clause, further comprising:
   a debris guard surrounding the bottom duct of the hydro turbulator system, wherein said debris guard is configured to prevent large particles from entering said hydro turbulator system.
4. The hydro turbulator system of any preceding clause, wherein said impeller system may be operated in an up flow configuration in which said first duct is a bottom duct which acts as an inlet and said second duct is a top duct which acts as an outlet for said volute; and
   wherein said impeller system may be operated in a down flow configuration in which the bottom duct acts as an outlet and said top duct acts as an inlet for said volute.
5. The hydro turbulator system of any preceding clause, wherein when the impeller system is configured in up flow configuration, fluid entering the hydro turbulator system may be lifted over a dike, a bank, or a flume while also off-gassing volatile chemicals and adding dissolved oxygen to the fluid.
6. The hydro turbulator system of any preceding clause, further comprising:
   a driveshaft operationally attached to said drive impeller and said first agitation impeller so that rotation of said driveshaft rotates said drive impeller and said first agitation impeller;
   a motor shaft attached to said motor and rotatable upon operation of the said motor; and
   a coupling connecting said motor shaft to said drive shaft so that rotation of said motor shaft causes rotation of said drive shaft.
7. The hydro turbulator system of clause 6, further comprising:
   a motor mounting assembly coupled to an end of said volute, wherein said motor is supported by said motor mounting assembly; and
   wherein said motor mounting assembly provides access to said coupling connecting said motor shaft to said driveshaft.
8. The hydro turbulator system of any preceding clause, further comprising:
   a casing, wherein said casing surrounds at a least a portion of said volute; and wherein said volute is slidable within said casing.
9. The hydro turbulator system of clause 8, further comprising:
   an internal support base positioned within said casing; and
   wherein said volute is supported within the casing by said internal support base.
10. The hydro turbulator system of claim 1, wherein said impeller system includes a second agitation impeller, and wherein said second agitation impeller is positioned in series with said drive impeller and said first agitation impeller along the fluid flow path.
11. A fluid treatment system comprising:
    a source fluid tank including a source fluid to be treated;
    a hydro turbulator system in fluid communication with said source fluid tank, wherein said hydro turbulator system includes:
    a volute, wherein said volute includes a top duct and a bottom duct, and wherein said top duct and said bottom duct are configured to allow fluid to enter and exit the volute;
    an impeller system positioned within the volute wherein said impeller system includes a first impeller and a second impeller;
    wherein rotation of said first impeller and said second impeller is configured to create successive zones of high pressure and low pressure within the volute; and
    a gas capture tank in fluid communication with said hydro turbulator system to receive fluid discharged from said hydro turbulator system, and wherein the gas capture tank includes treatment media configured to remove unwanted chemicals from the fluid discharged from said hydro turbulator system.
12. The fluid treatment system of clause 11, further comprising:
    a gas discharge blower attached to said gas capture tank;
    wherein said gas discharge blower removes off gassed volatile chemicals from said gas capture tank.
13. The fluid treatment system of any one of clause 11 or 12, wherein said first impeller and said second impeller are axially aligned.
14. The fluid treatment system of any one of clauses 11-13, wherein the hydro turbulator system is positioned exterior to said source fluid tank and said gas capture tank.
15. The fluid treatment system of any one of clauses 11-14, wherein the hydro turbulator system is at least partially submerged in the source fluid of said source fluid tank.

16. The fluid treatment system of clause 15, further comprising:
a debris guard surrounding the bottom duct of the hydro turbulator system, wherein said debris guard is configured to prevent large particles from entering said hydro turbulator system.

17. A fluid treatment system comprising:
a fluid treatment tank including a fluid to be treated;
a hydro turbulator system at least partially submerged in the fluid within said fluid treatment tank, wherein said hydro turbulator system includes:
a volute, wherein said volute includes a top duct and a bottom duct, and wherein said top duct and said bottom duct are configured to allow fluid to enter and exit the volute;
an impeller system positioned within the volute wherein said impeller system includes a first impeller and a second impeller;
wherein rotation of said first impeller and said second impeller is configured to create successive zones of high pressure and low pressure within the volute;
a discharge extension extending from one of said top duct and said bottom duct of said hydro turbulator system, wherein fluid within said hydro turbulator system is discharged into said fluid treatment tank from said discharge extension;
a suction extension pipe extending from one of said top duct and said bottom duct of said hydro turbulator system, wherein at least a portion of said suction extension pipe is substantially parallel to said discharge extension; and wherein said suction extension pipe is configured to provide suction to pull fluid into said hydro turbulator system;
fixed treatment media positioned between at least a portion of said discharge extension and a portion of said suction extension pipe; and
wherein fluid discharged from said discharge extension is pulled by said suction extension pipe so that the discharged fluid flows through said fixed treatment media.

18. The fluid treatment system of clause 17, further comprising:
at least one debris pipe extending from said suction extension pipe, wherein said debris pipe prevents large particles within the fluid from entering the suction extension pipe.

19. The fluid treatment system of any one of clause 17 or 18,
wherein the hydro turbulator system may be operated in an up flow configuration in which said top duct is fluidly connected to said discharge extension and said bottom duct is fluidly connected to said suction extension pipe; and
wherein the hydro turbulator system may be operated in a down flow configuration in which said top duct is fluidly connected to said suction extension pipe and said top duct is fluidly connected to said discharge extension.

20. The fluid treatment system of any one of clauses 17-19, wherein said first impeller and said second impeller are axially aligned.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A hydro turbulator system comprising:
a first wastewater tank having a liquid level control maintaining the liquid level in the first wastewater tank at a predetermined first liquid level;
a second wastewater tank or liquid containing means separate from said first wastewater tank;
a volute configured to receive wastewater from said first wastewater tank, wherein said volute includes a length, wherein said volute includes a first duct and a second duct, and wherein one of said first duct and said second duct are configured to allow the wastewater to enter the volute from the first wastewater tank and the other is configured to allow the wastewater to exit the volute and the enter the second wastewater tank or liquid containing means;
an impeller system positioned within the volute wherein said impeller system includes a drive impeller having a diameter, a first agitation impeller having a diameter, and a second agitation impeller having a diameter;
wherein said drive impeller, said first agitation impeller, and said second agitation impeller are positioned in series along a fluid flow path extending through the volute between the first duct and the second duct, and wherein rotation of said drive impeller, said first agitation impeller, and said second agitation impeller create successive zones of high pressure and low pressure along a length of the fluid flow path;
a motor operationally connected to said impeller system, wherein operation of the motor is configured to rotate the drive impeller, the first agitation impeller, and the second agitation impeller; and
a discharge extension attached to and extending from one of said first duct or said second duct of said hydro turbulator system, and wherein said discharge extension is configured to move said wastewater to the second wastewater tank or liquid containing means and is positioned above said predetermined first liquid level; and
wherein said drive impeller, said first agitation impeller, and said second agitation impeller are positioned below said predetermined first liquid level.

2. The hydro turbulator system of claim 1, further comprising:
a ring positioned within the volute around the drive impeller; and
wherein said ring defines a hydraulic diameter at the drive impeller.

3. The hydro turbulator system of claim 1, further comprising:
a debris guard surrounding one of said first duct or said second duct of the hydro turbulator system, wherein said debris guard is configured to prevent large particles from entering said hydro turbulator system.

4. The hydro turbulator system of claim 1, wherein said impeller system may be operated in an up flow configuration in which said first duct is a bottom duct which acts as an inlet and said second duct is a top duct which acts as an outlet for said volute; and
wherein said impeller system may be operated in a down flow configuration in which the bottom duct acts as an outlet and said top duct acts as an inlet for said volute.

5. The hydro turbulator system of claim 1, wherein when the impeller system is configured in up flow configuration, fluid entering the hydro turbulator system may be lifted over a dike, a bank, or a flume while also off-gassing volatile chemicals and adding dissolved oxygen to the fluid.

6. The hydro turbulator system of claim 1, further comprising:
- a driveshaft operationally attached to said drive impeller and said first agitation impeller so that rotation of said driveshaft rotates said drive impeller and said first agitation impeller;
- a motor shaft attached to said motor and rotatable upon operation of the said motor; and
- a coupling connecting said motor shaft to said drive shaft so that rotation of said motor shaft causes rotation of said drive shaft.

7. The hydro turbulator system of claim 6, further comprising:
- a motor mounting assembly coupled to an end of said volute, wherein said motor is supported by said motor mounting assembly; and
- wherein said motor mounting assembly provides access to said coupling connecting said motor shaft to said driveshaft.

8. The hydro turbulator system of claim 1, further comprising:
- a casing, wherein said easing surrounds at a least a portion of said volute; and
wherein said volute is slidable within said casing.

9. The hydro turbulator system of claim 8, further comprising:
- an internal support base positioned within said casing; and
- wherein said volute is supported within the casing by said internal support base.

10. The hydro turbulator system of claim 1,
- wherein said second agitation impeller is positioned on a driveshaft, and wherein said drive impeller and said first agitation impeller are also positioned on said driveshaft;
- wherein a distance between said second agitation impeller and said first agitation impeller is equal to a distance between said first agitation impeller and said drive impeller; and,
- wherein the diameter of said second agitation impeller is equal to the diameter of said drive impeller and equal to the diameter of said first agitation impeller.

11. The hydro turbulator system of claim 1, wherein said drive impeller and said first agitation impeller are axially aligned.

12. The hydro turbulator system of claim 1, wherein one of said first duct or said second duct is in fluid communication with a suction extension pipe; and wherein said suction extension pipe is configured to provide suction to pull fluid into said hydro turbulator system.

13. The hydro turbulator system of claim 12, wherein at least a portion of said suction extension pipe is substantially parallel to said discharge extension.

14. The hydro turbulator system of claim 12, further comprising at least one debris guard pipe extending from said suction extension pipe, wherein said debris guard pipe prevents large particles within the fluid from entering; the suction extension pipe.

15. The hydro turbulator system of claim 12,
- wherein the hydro turbulator system may be operated in a down flow configuration in which said first duct is fluidly connected to said discharge extension and said second duct is fluidly connected to said suction extension pipe; and
- wherein the hydro turbulator system may be operated in an up flow configuration in which said first duct is fluidly connected to said suction extension pipe and said second duct fluidly connected to said discharge extension.

16. The hydro turbulator system of claim 1, wherein the volute is positioned within the first wastewater tank.

* * * * *

UNITED STATES PATENT AND TRADEMARK OFFICE
CERTIFICATE OF CORRECTION

| | |
|---|---|
| PATENT NO. | : 11,938,452 B2 |
| APPLICATION NO. | : 18/153654 |
| DATED | : March 26, 2024 |
| INVENTOR(S) | : Robert W. Jacobi |

It is certified that error appears in the above-identified patent and that said Letters Patent is hereby corrected as shown below:

In the Claims

Column 19, Line 25, Claim 8, "wherein said easing" should be replaced with --wherein said casing--

Signed and Sealed this
Twenty-third Day of April, 2024

*Katherine Kelly Vidal*

Katherine Kelly Vidal
*Director of the United States Patent and Trademark Office*